United States Patent [19]

Suzuoka et al.

[11] Patent Number: 6,151,017

[45] Date of Patent: Nov. 21, 2000

[54] METHOD AND SYSTEM FOR DISPLAYING MULTIMEDIA DATA USING POINTING SELECTION OF RELATED INFORMATION

[75] Inventors: Takashi Suzuoka; Takeshi Yokokawa; Toshiki Kizu; Mitsuru Kakimoto; Yasushi Kawakura; Takeshi Aikawa, all of Tokyo, Japan

[73] Assignee: Kabushiki Kaisha Toshiba, Kawasaki, Japan

[21] Appl. No.: 08/713,301

[22] Filed: Sep. 12, 1996

[30] Foreign Application Priority Data

Sep. 12, 1995 [JP] Japan ................................ 7-234516

[51] Int. Cl.⁷ .......................... G06F 17/21; G09G 5/08; G06T 11/60
[52] U.S. Cl. ...................... 345/302; 345/157; 707/526
[58] Field of Search ............................ 345/302, 116, 345/112, 418, 328, 348, 133, 469, 330, 157; 386/7, 2

[56] References Cited

U.S. PATENT DOCUMENTS

| | | | |
|---|---|---|---|
| 4,950,069 | 8/1990 | Hutchinson | 351/210 |
| 4,973,149 | 11/1990 | Hutchinson | 351/210 |
| 5,742,294 | 4/1998 | Watanabe et al. | 345/425 |
| 5,767,897 | 6/1998 | Howell | 348/15 |

*Primary Examiner*—Joseph H. Feild
*Assistant Examiner*—Alford W. Kindred
*Attorney, Agent, or Firm*—Foley & Lardner

[57] ABSTRACT

A method and a system for displaying multimedia data including video data. A display of video data and related information are controlled according to a movement of a pointing selection marker, a type of related information, or a distribution of pointing selection possible regions over frames of video data. Linked related information can be displayed in synchronization with a progress of a display of the video data. Information indicating a presence/absence of pointing selection possible region for currently displayed video data can also be displayed. A useful information can be obtained by collecting a statistical information on the desired positions specified by the user's pointing selection inputs. Each frame of video data can be partitioned and related information can be provided in correspondence to partitioned parts of each frame.

32 Claims, 32 Drawing Sheets

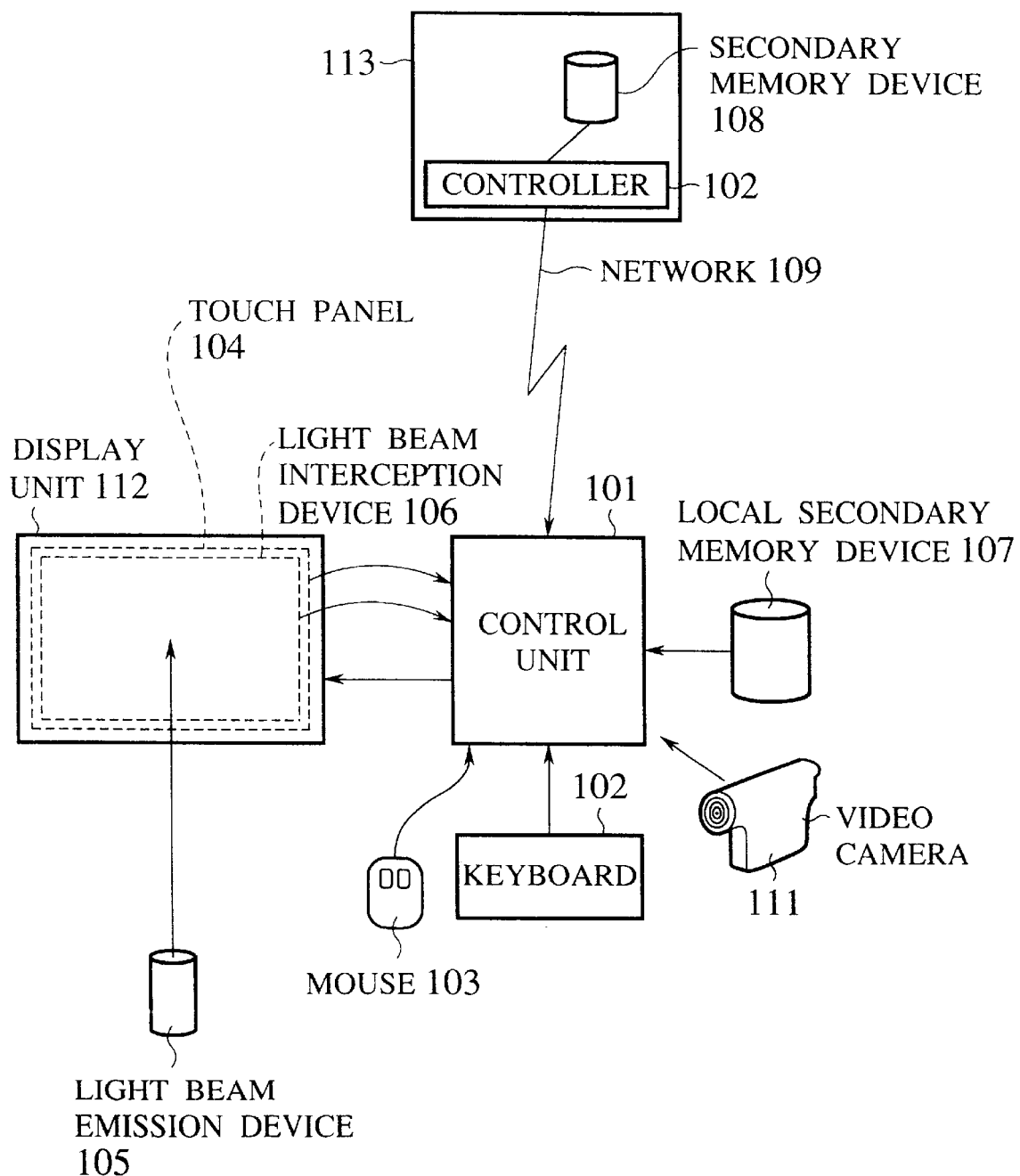

TIMEt$_0$

D$_0$ = (t$_0$, t$_1$) NIL

C$_0$ = 0

TIMEt$_1$

D$_1$ = (t$_1$, t$_2$)(((x$_a$, y$_a$), (x$_b$, y$_b$), CAR1))

C$_1$ = 1

TIMEt$_2$

D$_2$ = (t$_2$, t$_3$)(((x$_c$, y$_c$), (x$_d$, y$_d$), CAR1)
((x$_e$, y$_e$), (x$_f$, y$_f$), CAR3))

C$_2$ = 2

TIMEt$_3$

D$_3$ = (t$_3$, t$_4$)(((x$_g$, y$_g$), (x$_h$, y$_h$), CAR3))

C$_3$ = 1

TIMEt$_4$

D$_4$ = (t$_4$, t$_5$) NIL

C$_4$ = 0

SOURCE VIDEO 130, 112, RELATED INFORMATION 131

| TIME | REGION | RELATED INFORMATION TYPE | DISPLAY TIME | ADDRESS |
|---|---|---|---|---|
| $t_0$ | $(x_0, y_0) - (x_1, y_1)$ | TEXT | Tt | 0xFF10F |
| $t_3$ | $(x_3, y_3) - (x_4, y_4)$ | STATIC IMAGE | Ts | 0xA000B |
| $t_7$ | $(x_7, y_7) - (x_8, y_8)$ | TEXT | Tt | 0xCDDEF |
| ⋮ | ⋮ | ⋮ | ⋮ | ⋮ |

FIG.15
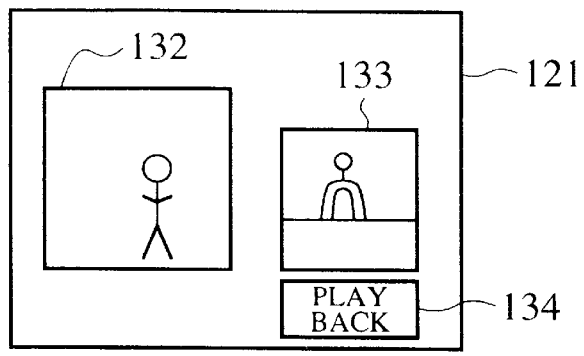
FIG.16
| TIME | REGION | TYPE | DISPLAY TIME | ADDRESS |
|------|--------|------|--------------|---------|
| $t_0$ | $(x_0, y_0)-(x_1, y_1)$ | VIDEO | Tx | 0xFF10FD |
| $t_3$ | $(x_3, y_3)-(x_4, y_4)$ | TEXT | Ty | 0x123456 |
| $t_7$ | $(x_7, y_7)-(x_8, y_8)$ | VIDEO | Tz | 0x74320F |
| ⋮ | ⋮ | ⋮ | ⋮ | ⋮ |
FIG.17
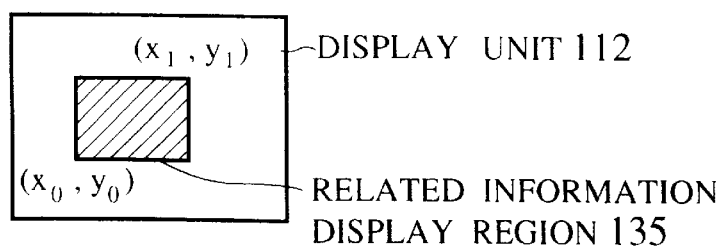

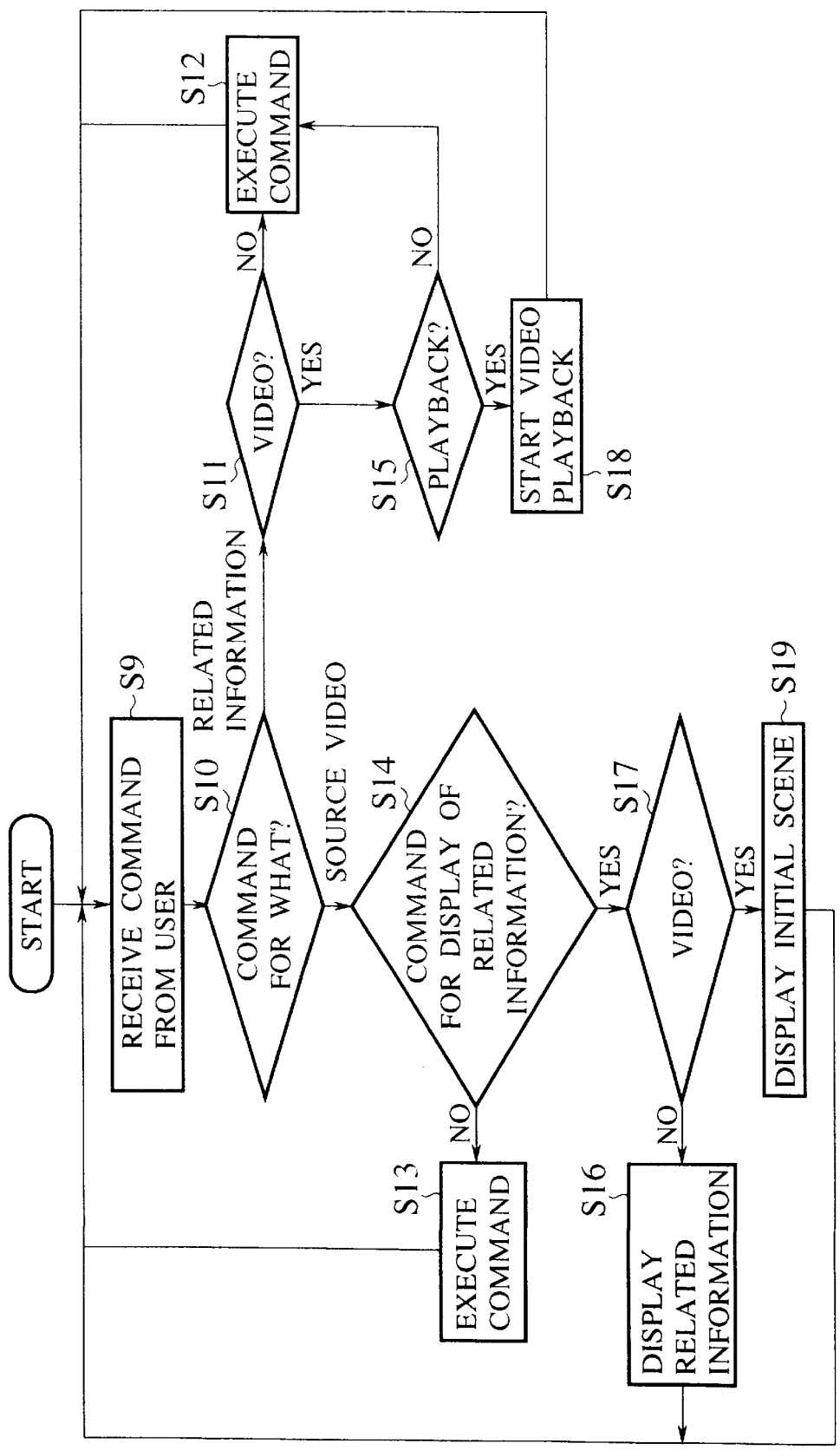

FIG.32

| 3.5 sec. | | | |
|---|---|---|---|
| 3 | | | |
| ELLIPSE | CENTER COORDINATES $(x_0, y_0)$ | HORIZONTAL DIAMETER $\ell 0$ | VERTICAL DIAMETER $\ell 0'$ |
| RECTANGLE | UPPER LEFT CORNER COORDINATES $(x_1, y_1)$ | LOWER RIGHT CORNER COORDINATES $(x'_1, y'_1)$ | |
| RECTANGLE | UPPER LEFT CORNER COORDINATES $(x_2, y_2)$ | LOWER RIGHT CORNER COORDINATES $(x'_2, y'_2)$ | |

FIG.33

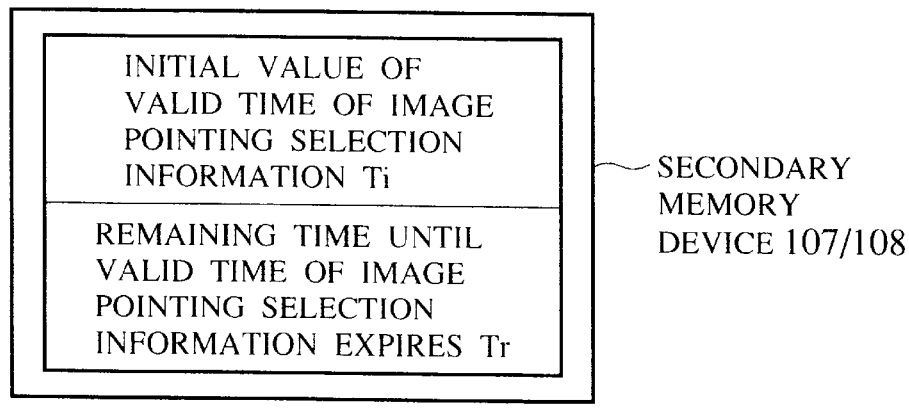

INITIAL VALUE OF VALID TIME OF IMAGE POINTING SELECTION INFORMATION Ti

REMAINING TIME UNTIL VALID TIME OF IMAGE POINTING SELECTION INFORMATION EXPIRES Tr

— SECONDARY MEMORY DEVICE 107/108

FIG.34

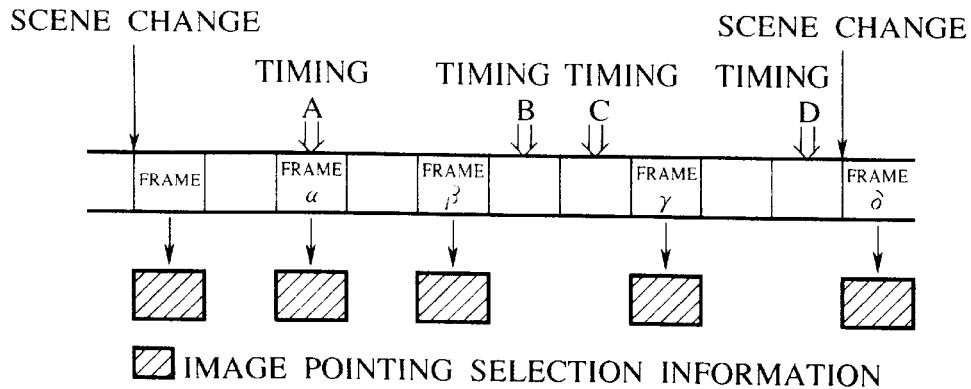

▨ IMAGE POINTING SELECTION INFORMATION

FIG.36

| SCENE 1 |  |
|---|---|
| POINTING SELECTION POSSIBLE IMAGE 1 | |
| POINTING SELECTION POSSIBLE IMAGE 2 | |
| NUMBER n1 OF COORDINATES OF REGIONS FOR USER'S UNSUCCESSFUL POINTING SELECTION ATTEMPTS ||
| COORDINATES 1 ||
| COORDINATES 2 ||
| ⋮ ||
| COORDINATES n1 ||

⋮

| SCENE N |  |
|---|---|
| POINTING SELECTION POSSIBLE IMAGE 1 | |
| POINTING SELECTION POSSIBLE IMAGE 2 | |
| POINTING SELECTION POSSIBLE IMAGE 3 | |
| NUMBER nN OF COORDINATES OF REGIONS FOR USER'S UNSUCCESSFUL POINTING SELECTION ATTEMPTS ||
| COORDINATES 1 ||
| COORDINATES 2 ||
| ⋮ ||
| COORDINATES nN ||

SECONDARY MEMORY DEVICE 107/108

TIME Ta   TIME Tb   TIME Tc   TIME Td

METHOD AND SYSTEM FOR DISPLAYING MULTIMEDIA DATA USING POINTING SELECTION OF RELATED INFORMATION

BACKGROUND OF THE INVENTION

1. Field of the Invention

The present invention relates to a method and a system for displaying multimedia data which assists a user's pointing selection of related information on a displayed video image.

2. Description of the Background Art

The multimedia software is evolving from those using static images to the hypertext using video images, and there are some propositions for enabling a user to obtain a related information by making a pointing selection of a part of the video image in the multimedia software using video images.

However, the conventional propositions only allow a user to make a pointing selection of an entire video image, or requires a user to make many attempts for a pointing selection which can only be successful by chance.

In a case of using the authoring tool ASTAUND of the Focal Point Computer, Inc., it is possible to display a frame around an object that can be selected by a pointing selection, but a frame is always going to be displayed, so that a frame can be distracting when the user does not wish to make any pointing selection.

In a case of the multimedia software authoring method disclosed in Japanese Patent Application Laid Open No. 7-105227 (1995), when start and end positions of a moving object is specified by rectangles in the video image, a motion of the moving object between the start and end positions are obtained by the linear interpolation. However, the user is required to specify a position to make a pointing selection by fully understating this framework of the linear interpolation.

In addition, in the prior art multimedia data display method, the source video image is closed or stopped when a display of a related information is requested, so that it is impossible for a user to enjoy both the source video image and the related information simultaneously.

In summary, the problems associated with the prior art multimedia data display method are as follows.

It is difficult to make a pointing selection of a desired position in a displayed source video image. More specifically, the following two problems are encountered.

(A1) It is difficult to see whether there is any position which can be selected by a pointing selection for the purpose of obtaining the related information. Moreover, even when such a position is known to be provided, it is difficult to recognize where this position is located in a displayed source video image.

(A2) It requires a considerable amount of efforts to a user to capture a moving target object of the pointing selection by means of the input device such as mouse.

(B) It is sometimes difficult for a user to understand a form of display of the source video image or the related information.

It is difficult to produce display data. More specifically, the following problem is encountered.

(C) It requires a considerable amount of works to specify a position that can be selected by a pointing selection in the video image portion.

SUMMARY OF THE INVENTION

It is therefore an object of the present invention to provide multimedia data display method and system capable of easily notifying a presence of a position that can be selected by a pointing selection to a user.

It is another object of the present invention to provide multimedia data display method and system enabling a user to make a pointing selection of a target object easily in a source video image.

It is another object of the present invention to provide multimedia data display method and system capable of realizing a manner of display of a source video image and/or a related information which is easy to comprehend.

It is another object of the present invention to provide multimedia data display method and system for enabling an easy production of source video data and related information.

According to one aspect of the present invention there is provided a method for displaying multimedia data including video data, in a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of: displaying the video data at a prescribed video display region; displaying a prescribed pointing selection marker at a position specified by a user; and controlling a display of the video data so as to display the video data by a special display method when a display position of the pointing selection marker is moved from outside the video display region to inside the video display region, and the related information is provided in correspondence to the video data currently displayed in the video display region, the special display method being different from a usual display method by which the video data are displayed when the display position of the pointing selection marker is located outside the video display region.

According to another aspect of the present invention there is provided a method for displaying multimedia data including video data, in a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of: displaying the video data at a prescribed video display region; and displaying an information indicating a presence/absence of pointing selection possible region set up with respect to the video data currently displayed in the video display region.

According to another aspect of the present invention there is provided a method for displaying multimedia data including video data, in a system which displays video data having at least one pointing selection possible region set up in advance and being associated with at least one related information provided in correspondence to the pointing selection possible region, the method comprising the steps of: displaying the video data; displaying one related information corresponding to a pointing selection possible region which contains a position specified by a user's pointing selection input; and controlling a display of the video data so as to display the video data by a special display method when said one related information is video information, while said one related information is displayed, the special display method being different from a usual display method by which the video data are normally displayed.

According to another aspect of the present invention there is provided a method for displaying multimedia data including video data, in a system which displays video data having at least one pointing selection possible region set up in advance and being associated with at least one related information provided in correspondence to the pointing selection possible region, the method comprising the steps of: displaying the video data; displaying one related information corresponding to a pointing selection possible region which contains a position specified by a user's pointing selection input; and controlling a display of said one related information so as to display said one related information by a special display method when said one related information is video information, the special display method being different from a usual display method by which the related information is normally displayed.

According to another aspect of the present invention there is provided a method for displaying multimedia data including video data, in a system which displays video data formed by a series of frames, the video data having a plurality of pointing selection possible regions set up in advance and being associated with a plurality of related information provided in correspondence to the pointing selection possible regions, said plurality of related information including more than one related information which are provided with respect to different frames of the video data and which are linked together, the system also displaying a related information corresponding to a pointing selection possible region which contains a position specified by a user's pointing selection input, the method comprising the steps of: displaying the video data; and sequentially updating a content of a related Information to be displayed among said more than one related information in synchronization with a progress of a display of the video data.

According to another aspect of the present invention there is provided a method for displaying multimedia data including video data, in a system which displays video data formed by a series of frames, the video data having a plurality of pointing selection possible regions set up in advance with respect to a selected number of frames and being associated with a plurality of related information provided in correspondence to the pointing selection possible regions, the system also displaying a related information corresponding to a pointing selection possible region which contains a position specified by a user's pointing selection input, the method comprising the steps of: displaying the video data: and controlling a display of the video data when a request for a transition to a mode for allowing a user's pointing selection input is entered and a currently displayed frame has no pointing selection possible region, by playbacking the video data up to another frame which has a pointing selection possible region, and pausing/slowing down the playback of the video data at said another frame.

According to another aspect of the present invention there is provided a method for obtaining an information useful in producing multimedia data including video data, for a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of: displaying the video data; receiving user's pointing selection inputs specifying desired positions in the video data for obtaining the related information; collecting a statistical information on the desired positions specified by the user's pointing selection inputs; and providing the statistical information as an information indicative of targets of user's interests in the video data.

According to another aspect of the present invention there is provided a method for displaying multimedia data including video data, in a system which displays video data formed by a series of frames, each frame being partitioned into partitioned parts by a prescribed partition scheme and being associated with a plurality of related information provided in correspondence to the partitioned parts, the method comprising the steps of: displaying the video data: receiving a user's pointing selection input specifying a desired position in a currently displayed frame for obtaining the related information; and displaying a related information provided in correspondence to one partitioned part which contains the desired position specified by the user's pointing selection input, by identifying said one partitioned part according to an information on the prescribed partition scheme used in partitioning the currently displayed frame and an information on the desired position specified by the user's pointing selection input.

According to another aspect of the present invention there is provided a system for displaying multimedia data including video data, the video data having at least one pointing selection possible region set up in advance and being associated with at least one related information provided in correspondence to the pointing selection possible region, the system comprising: a display device for displaying the video data at a prescribed video display region, a prescribed pointing selection marker at a position specified by a user, and a related information corresponding to a pointing selection possible region which contains a position specified by a user's pointing selection input; and a control device for controlling a display of the video data by the display device so as to display the video data by a special display method when a display position of the pointing selection marker is moved from outside the video display region to inside the video display region and the related information is provided in correspondence to the video data currently displayed in the video display region, the special display method being different from a usual display method by which the video data are displayed when the display position of the pointing selection marker is located outside the video display region.

According to another aspect of the present invention there is provided a system for displaying multimedia data including video data, the video data having at least one pointing selection possible region set up in advance and being associated with at least one related information provided in correspondence to the pointing selection possible region, the system comprising: first display means for displaying the video data at a prescribed video display region, and a related information corresponding to a pointing selection possible region which contains a position specified by a user's pointing selection input; and second display means for displaying an information indicating a presence/absence of pointing selection possible region set up with respect to the video data currently displayed in the video display region.

According to another aspect of the present invention there is provided a system for displaying multimedia data including video data, the video data having at least one pointing selection possible region set up in advance and being associated with at least one related information provided in correspondence to the pointing selection possible region, the system comprising: a display device for displaying the video data, and one related information corresponding to a pointing selection possible region which contains a position specified by a user's pointing selection input; and a control device for controlling a display of the video data by the display device so as to display the video data by a special display method when said one related information is video information, while said one related information is displayed, the special display method being different from a usual display method by which the video data are normally displayed.

According to another aspect of the present invention there is provided a system for displaying multimedia data including video data, the video data having at least one pointing selection possible region set up in advance and being associated with at least one related information provided in correspondence to the pointing selection possible region, the system comprising: a display device for displaying the video data, and one related information corresponding to a pointing selection possible region which contains a position specified by a user's pointing selection input; and a control device for controlling a display of said one related information so as to display said one related information by a special display method when said one related information is video information, the special display method being different from a usual display method by which the related information is normally displayed.

According to another aspect of the present invention there is provided a system for displaying multimedia data including video data formed by a series of frames, the video data having a plurality of pointing selection possible regions set up in advance and being associated with a plurality of related information provided in correspondence to the pointing selection possible regions, said plurality of related information including more than one related information which are provided with respect to different frames of the video data and which are linked together, the system comprising: a display device for displaying the video data, and a related information corresponding to a pointing selection possible region which contains a position specified by a user's pointing selection input; and a control device for sequentially updating a content of a related information to be displayed by the display device among said more than one related information in synchronization with a progress of a display of the video data.

According to another aspect of the present invention there is provided a system for displaying multimedia data including video data formed by a series of frames, the video data having a plurality of pointing selection possible regions set up in advance with respect to a selected number of frames and being associated with a plurality of related information provided in correspondence to the pointing selection possible regions, the system comprising: a display device for displaying the video data, and a related information corresponding to a pointing selection possible region which contains a position specified by a user's pointing selection input; and a control device for controlling a display of the video data by the display device when a request for a transition to a mode for allowing a user's pointing selection input is entered and a currently displayed frame has no pointing selection possible region, by playbacking the video data up to another frame which has a pointing selection possible region, and pausing/slowing down the playback of the video data at said another frame.

According to another aspect of the present invention there is provided a system for obtaining an information useful in producing multimedia data including video data, the video data having at least one pointing selection possible region set up in advance and being associated with at least one related information provided in correspondence to the pointing selection possible region, so as to be able to display a related information corresponding to a pointing selection possible region which contains a position specified by a user's pointing selection input, the system comprising: a display device for displaying the video data; and a control device for receiving user's pointing selection inputs specifying desired positions in the video data for obtaining the related information, collecting a statistical information on the desired positions specified by the user's pointing selection inputs, and providing the statistical information as an information indicative of targets of user's interests in the video data.

According to another aspect of the present invention there is provided a system for displaying multimedia data including video data formed by a series of frames, each frame being partitioned into partitioned parts by a prescribed partition scheme and being associated with a plurality of related information provided in correspondence to the partitioned parts, the system comprising: a display device for displaying the video data, and a related information; and a control device for receiving a user's pointing selection input specifying a desired position in a currently displayed frame for obtaining the related information, identifying said one partitioned part according to an information on the prescribed partition scheme used in partitioning the currently displayed frame and an information on the desired position specified by the user's pointing selection input, and controlling the display device to display the related information provided in correspondence to said one partitioned part.

Other features and advantages of the present invention will become apparent from the following description taken in conjunction with the accompanying drawings.

BRIEF DESCRIPTION OF THE DRAWINGS

FIG. 1 is a block diagram of a multimedia data display system according to the present invention.

FIG. 15 is an illustration of an exemplary display screen of a display unit in the system of FIG. 1 in the third embodiment of the present invention.

FIG. 18 is an illustration of a table used in a control unit of the system of FIG. 1 in the third embodiment of the present invention.

FIG. 17 is an illustration of an exemplary related information display region in a display unit of the system of FIG. 1 in the third embodiment of the present invention.

FIG. 18 is a flow chart for the operation of a control unit at a time of displaying a related information in the third embodiment of the present invention.

FIG. 32 is an illustration of an exemplary region got storing an image pointing selection information used in the sixth embodiment of the present invention.

FIG. 33 is an illustration of an information provided in a secondary memory device of the system of FIG. 1 in the sixth embodiment of the present invention.

FIG. 34 is an illustration of another exemplary video data used in the sixth embodiment of the present invention.

FIG. 36 is an illustration of an exemplary data structure for collecting a statistical information in a secondary memory device of the system of FIG. I in the seventh embodiment of the present invention.

DETAILED DESCRIPTION OF THE PREFERRED EMBODIMENTS

Figure 2A:
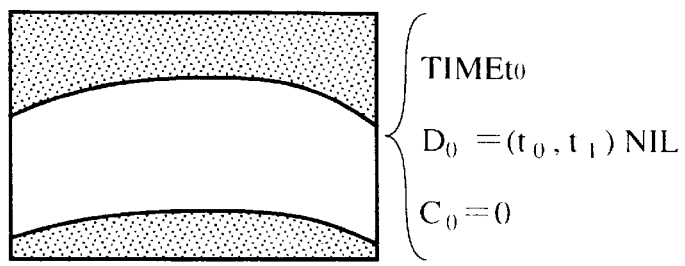
FIGS. 2A to 2E are illustrations of exemplary video images and data structures used in the system of FIG. 1.

First, with references to FIG. 1 to FIG. 4, the basic configuration of a multimedia data display system according to the present invention will be described.

FIG. 1 shows a basic configuration of the multimedia data display system of the present invention, which has a control unit 101, a display unit 112, prescribed types of input devices, and a prescribed secondary memory device.

The control unit 101 controls the system as a whole. Namely, an input from a user is processed, and multimedia data such as static image data, video data, text data, and speech data are read out from the secondary memory device and outputted to the display device 112. Also, according to an input from a user, the related information is displayed at the display unit 112 when it is possible to make an access to the relation information at a position specified on a screen of the display unit 112 on which a source video image is displayed.

The input devices for receiving inputs from a user can be given in a form of a keyboard 102, a mouse 103, a touch panel 104, a combination of a light beam emission device 105 and a light beam interception device 106 such as those for infrared rays, etc. One or more of these devices can be used as the input devices of this multimedia data display system.

In a case of using the keyboard 102, a selection position on the video image is specified by operating a cursor, cullet, or pointer displayed on the display unit 112. In this case, the occurrence of the pointing selection can be notified to the control unit 101 by depressing a prescribed key of the keyboard 102. Similarly, in a case of using the mouse 103, a selection position on the video image is specified by operating a cursor, a cullet, or pointer displayed on the display unit 112. In this case, the occurrence of the pointing selection can be notified to the control unit 101 by depressing a button on the mouse 103. In a case of using the touch panel 104, a selection position is specified by touching a desired position on the display unit 112, and this fact can be notified to the control unit 101. In a case of using a light beam, a selection position on the display unit 112 is specified by a light beam from the light beam emission device 105, and intercepting this light beam at the light beam interception device 106, and this fact can be notified to the control unit 101.

The multimedia data such as static image data, video data, text data, and speech data can be taken out by the control unit 101 from a local secondary memory device (such as magnetic disk device for example) 107 which is locally connected to this system, or from a secondary memory device 108 via a controller 110 within an external device 113 which is connected with this system through a network 109. In addition, as far as the video data and speech data are concerned, it is also possible to directly enter the video data and speech data from a video camera 111 into the control unit 101.

The display unit 112 displays the video data, static Image data and text data while reproducing the speech data, according to a command from the control unit 101.

Next, the basic data structure used in the multimedia data display system of the present invention.

The basic data structure is data for describing "time in video image" and "what is shown at a spatial position". In the following, an exemplary form of the basic data structure will be described by using exemplary video images shown in FIGS. 2A to 2E.

Figure 2B:
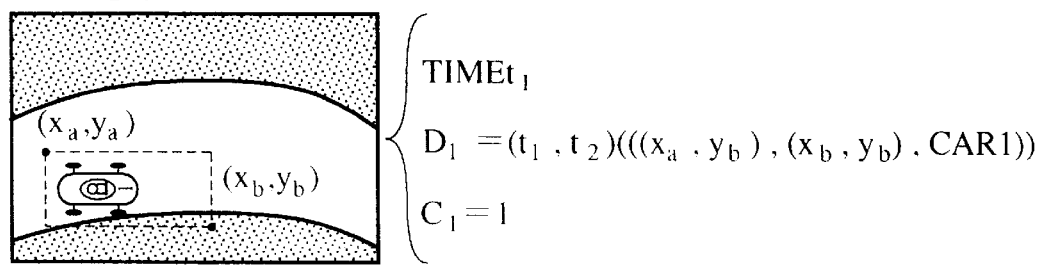
Figure 2C:
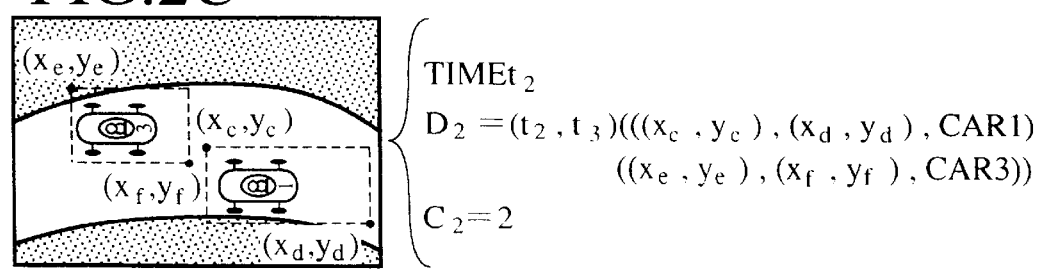
Figure 2D:
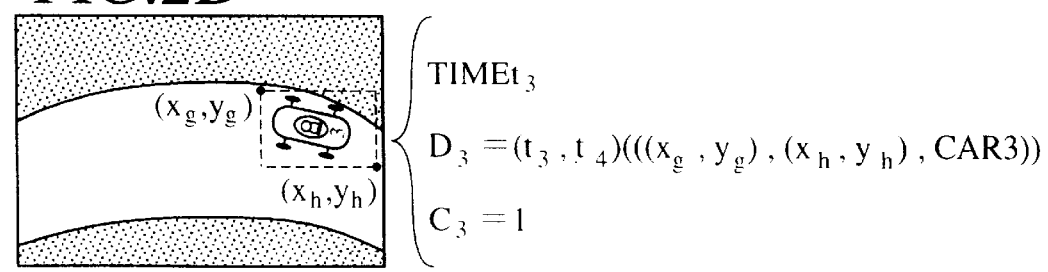
Figure 2E:
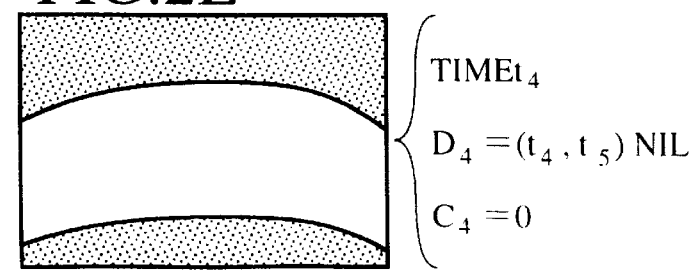

FIGS. 2A to 2E show the following scenes. Namely, FIG. 2A shows an image at a time t0 in which no car is shown. FIG. 2 shows an image at a time t1 in which a car with a car number 1 alone is shown. FIG. 2C shows an image at a time t2 in which a car with a car number 1 running ahead and a car with a car number 3 running behind are shown. FIG. 2D shows an image at a time t3 in which a car with a car number 3 alone is shown. FIG. 2E shows an image at a time t4 in which no car is shown.

Now, by using some authoring tool, the position information for each car at each time is described. Then, a list data D as shown in FIGS. 2A to 2E in correspondence the image at each time is produced. Each list data Di is described as data for a time t (ti≦t<t(i+1)).

For example, $$D0=(t0, t1)NIL$$

shown in FIG. 2A expresses that there is no information related to the image between time t0 and time t1.

Also, $$D1=(t1, t2)(((xa, ya), (xb, by), car1))$$

shown in FIG. 2B expresses that a "car1" (car with a car number 1) is present in a rectangular region defined by diagonal corners (xa, ya) and (xb, yb) between time t1 and time t2.

Similarly, $$D2=(t2, t3)(((xc, yc), (xd,. yd), car1), (xe, ye), (xf, yt), car3)$$

shown in FIG. 2C expresses that a "car1" (car with a car number 1) is present in a rectangular region defined by diagonal corners (xc, ye) and (xd, yd) while a "car3" (car with a car number 3) is present in a rectangular region defined by diagonal corners (xe, ye) and (xf, yf) between time t2 and time t3.

Similarly, $$D3=(t3, t4)(((xg, yg), (xh, yh), car3))$$

shown in FIG. 2D expresses that a "car3" (car with a car number 3) is present in a rectangular region defined by diagonal corners (xg, yg) and (xh, yh) between time t3 and time t4.

Also, $$D4=(t4, t5)NIL$$

shown in FIG. 2E expresses that there is no information related to the image between time t4 and time t5.

In this description scheme, the description is given for a time zone spanning from time t1 to time t(i+1), so that a rectangular region in which a target object is present is also given as a total sum of rectangular regions for times within this time zone. For example, in FIGS. 2B, 2C and 2D, a car is moving forward, so that a rectangular region defined in Di is elongated in forward direction rather than a rectangle which just encloses a car at a time ti.

Note that the time t here indicates a time since a start of the video playback. Consequently, when the video playback is paused, the time t also pauses, whereas when the video playback is in a fast forward mode, the time t progresses faster than the real time, and when the video playback is in a reverse mode, the time t progresses backward (i.e., a value of the time t decreases).

The list data Di are provided along an entire length of the video data. Namely, when the last video data is (n−1)-th one; the normal playback time of the video data is tn, and D0 to D(n−1) are defined.

This description scheme is not accurate strictly speaking because the time is segmented into time zones and a position of a target object is described by a rectangular region within a segmented time zone, but it is a conveniently simple one which is practically useful. Note that the present invention is equally applicable to this simple description scheme as well as any other more complicated scheme (such as a scheme using a linear interpolation). In the following, a case of using this simple description scheme will be described for the sake of simplicity of explanation.

In this description scheme, a data structure C is also provided in addition to the list data D. Here, Ci indicates a number of elements in the list data Di (that is, how many target objects are described in Di).

Figure 3:
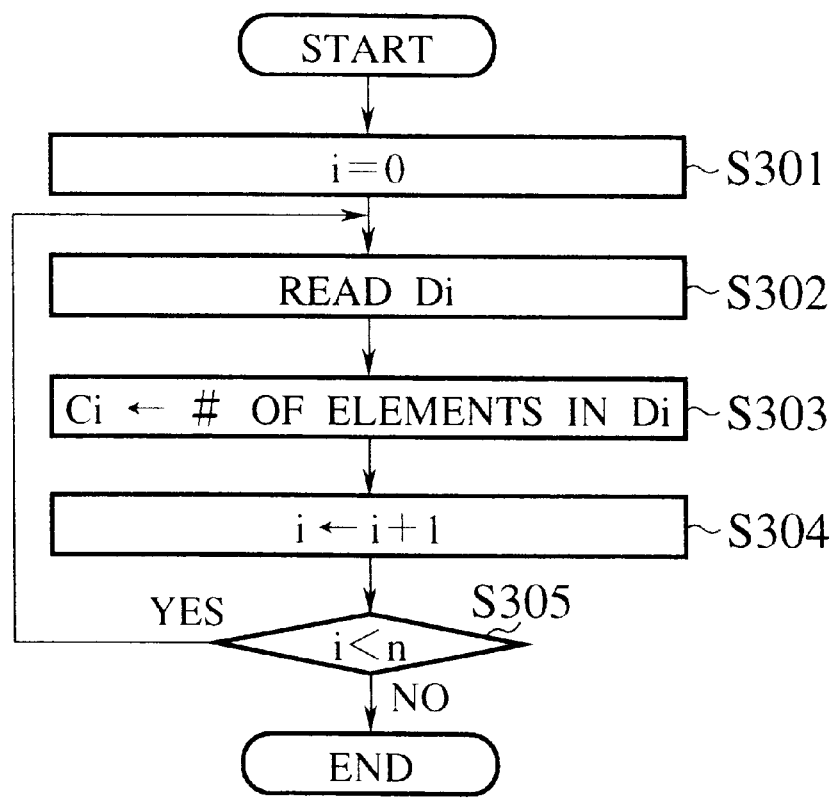
FIG. 3 is a flow chart for a procedure to obtain a number of elements in a list data used in the system of FIG. 1.

This Ci can be easily obtained by the algorithm shown in FIG. 3. Namely, a counter i is initialized to 0 at the step S301, and the list data Di is read at the step S302. Then, a number of elements in the list data Di is counted and a counted number is stored into Ci at the step S303. Then, a counter i is incremented by one, and the operation returns to the step S302 when the incremented counter i is less than a total number n of data, or the operation is terminated otherwise, at the step S305.

In an example shown in Fits. 2A to 2E, C0=0, C1=1, C2=2, C3=1, and C4=0 will be obtained.

Next, the input mode will be described.

In a state where the video image is displayed as a source video image on the display unit 112 (including a state in which the video image is paused), a user can specify any desired position of the video display portion on the display unit 112 by using the input device. Then, when the related information exists at a specified position, the related information is displayed on the display unit 112.

Note however that the image on the display unit 112 has a pointing selection impossible mode and a pointing selection possible mode, and it is possible to make a pointing selection of a target object for the purpose of obtaining the related information of the target object in the image only when the image is in the pointing selection possible mode.

Figure 4:
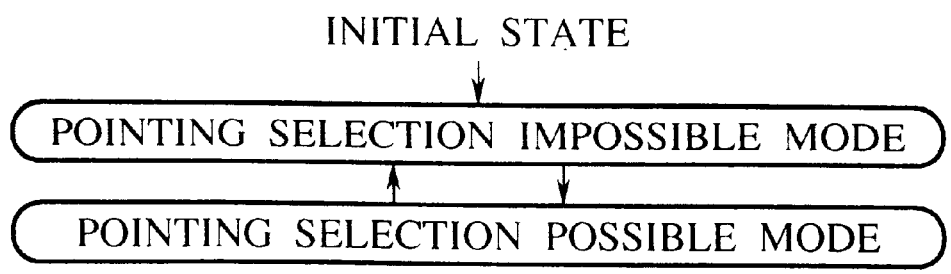
FIG. 4 is a diagram showing a manner of transition between a pointing selection impossible mode and a pointing selection possible mode used in the system of FIG. 1.

In other words, unless the image is in the pointing selection possible mode, it is impossible to display the related information of the image according to the user's will no matter how the input is entered. Transitions between these two modes are made as shown in FIG. 4. In the initial state, it is in the pointing selection impossible mode.

In the following, various embodiments of the present invention will be described one by one. In each embodiment described below, it is assumed that the system has the basic configuration as described above.

It should be noted here that the following embodiments can be practiced independently from each other in principle, but they can also be practiced in any desired combination.

First Embodiment

Referring now to FIG. 5 to FIG. 10, the first embodiment of the multimedia data display method and system according to the present invention will be described in detail.

This first embodiment is directed to a case of resolving the problems (A1) and (A2) mentioned above.

Here, a pointing selection marker is indicated by a pointer of the mouse 103. The processing proceeds by interruptions caused by events. In the following, three interrupt processings will be described.

The first interruption is caused when a position of a pointer is moved by the mouse 103, in which a processing for mode switching, etc. is carried out. The second interruption is caused by a timer interruption, in which an update of situation is carried out. The third interruption is caused by a clicking of the mouse 103, in which the related information is displayed if it is available.

In these processings, a variable indicating a data number i is given commonly. At a time of video playback start, the variable i is initialized to 0, and thereafter this variable i is changed and referred by the three routines described below.

The time t is a relative time since the video playback start until an entry into each routine. Consequently, the time t can be referred but cannot be changed within each routine. The time t is set to be 0 at a time of the video playback start, and progresses at the same rate as the real time during the normal playback. However, when the video playback is paused, the time t also remains unchanged, whereas when the video playback is in a fast forward mode, the time t progresses faster than the real time by the fast forward playback speed, and when the video playback is in a reverse mode, the time t progresses backward (i.e., a value of the time t decreases) by the reverse playback speed.

First, the mouse move interrupt processing will be described.

Figure 5:
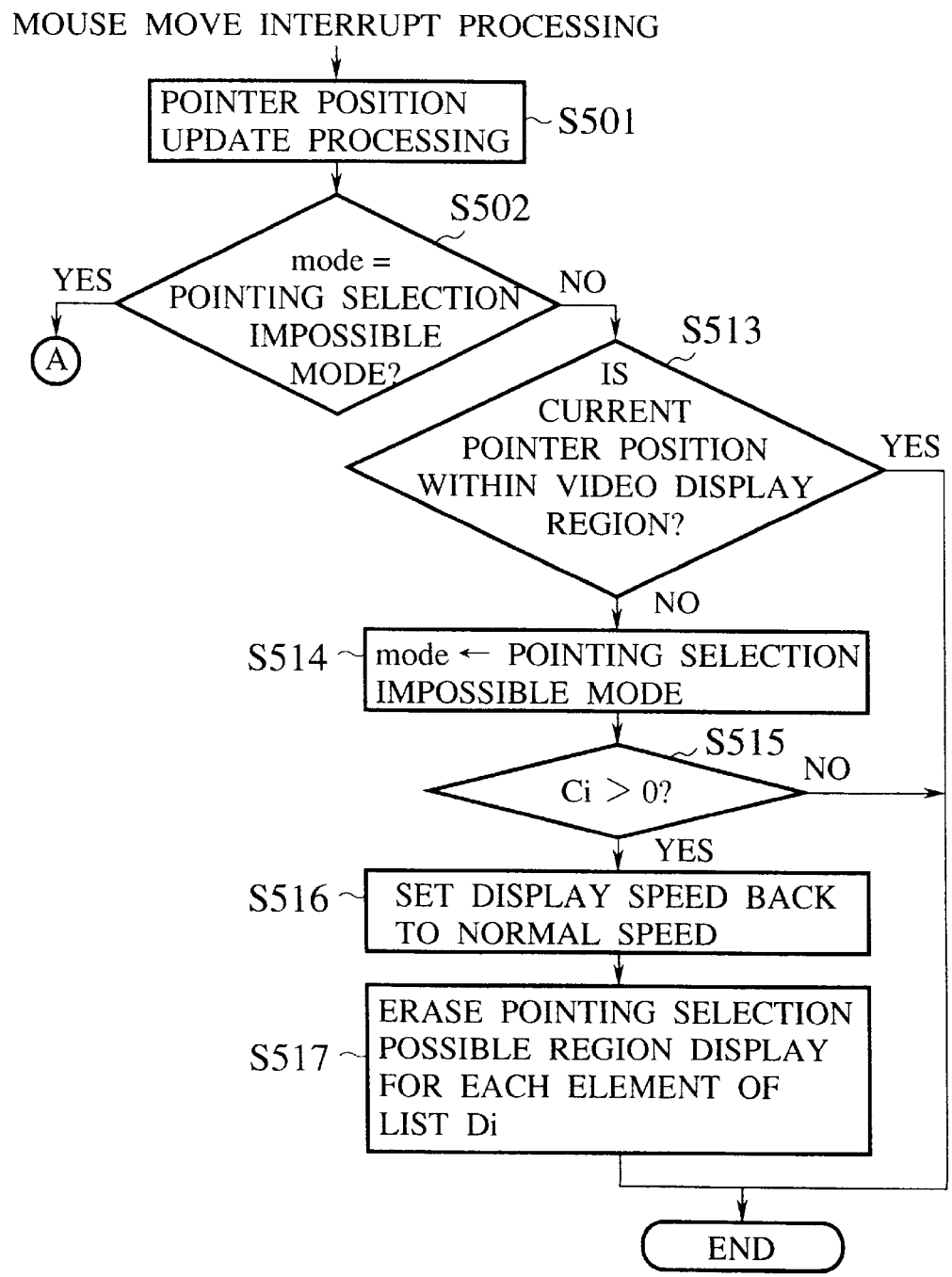
FIG. 5 and FIG. 6 are a flow chart for a mouse move interrupt processing by a control unit in the system of FIG. 1 in the first embodiment of the present invention.
Figure 6:
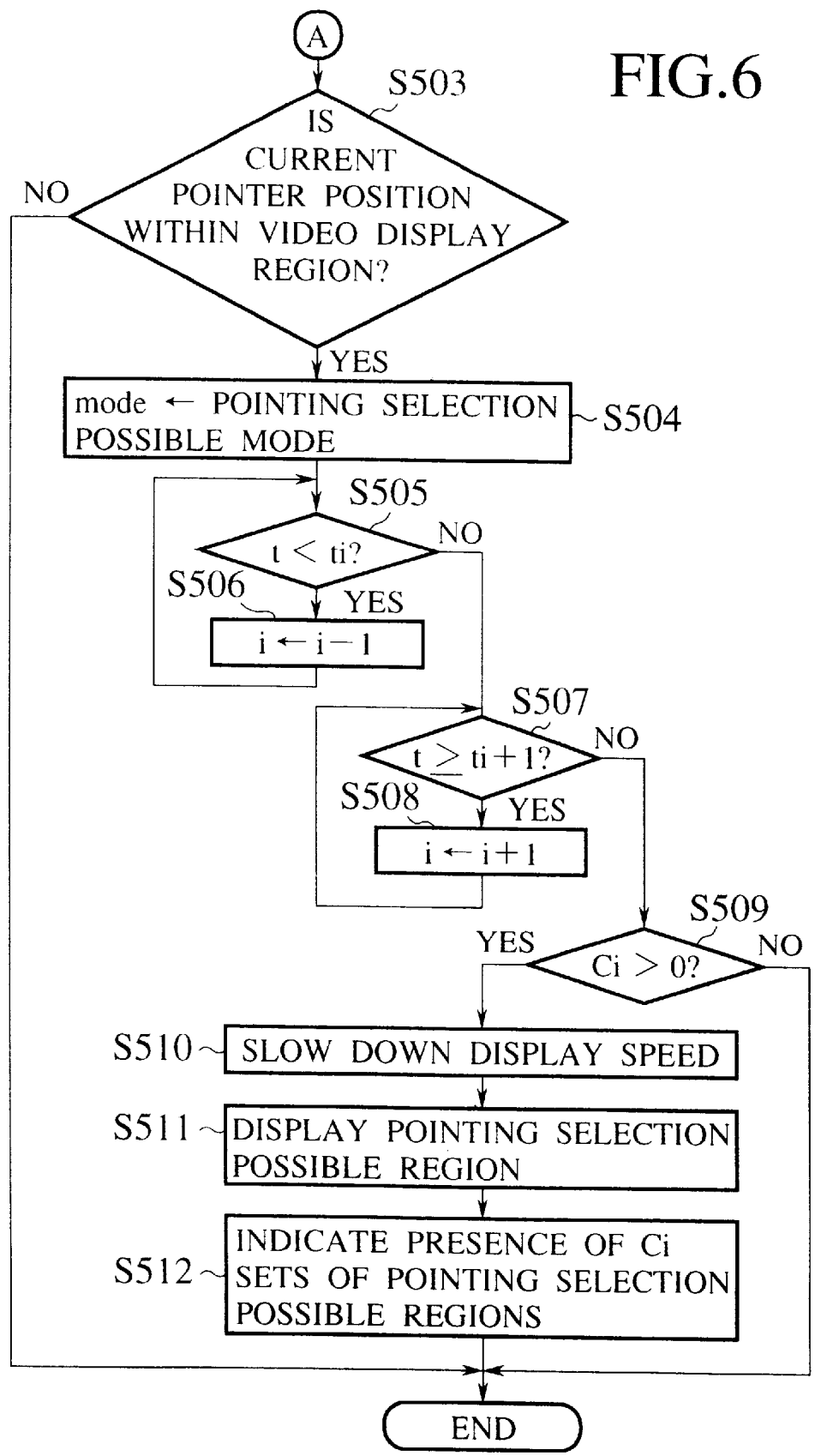

When the movement of the mouse 103 is detected, the control unit 101 is interrupted, and the control unit 101 carries out the processing according to the flow chart of FIG. 5 and FIG. 6 as follows.

First, the pointer position update processing is carried out. In this processing, a new pointer position is read, an old position is erased from the display unit 112, and a new position is displayed at the display unit 112 (step S501). Then, whether the mode is the pointing selection impossible mode or not is checked (step S502).

When it is the pointing selection impossible mode, whether a current pointer position is within the video display region or not is checked next (step S503). When a current pointer position is within the video display region, the mode is changed to the pointing selection possible mode (step S504). Then, the data number i is updated. Namely, when the time t is before the time ti of the currently referred data i (step S505 YES), the data number i is decreased (step S506). until the time ti of the data number i reaches to a time zone of the time t (step S505 NO). When the time t is after the time ti of the currently referred data i (step S507 YES), the data number i is increased (step S50), until the time ti of the data number i reaches to a time zone of the time t (step S507 NO).

Then, in order to check whether it is possible to provide the related information at the time t, whether Ci is greater than 0 or not is checked (step S509). Here, Ci stores a number of objects for which the related information can be provided at a time zone including the time t. When this Ci is a positive number (step S509 YES), it is in the pointing selection possible mode and the pointing selection possible position is present, so that the display speed is slowed down (step S510), and the pointing selection possible region in the list data Di is displayed (step S511).

At this point, the pointing selection possible region can be indicated by displaying a frame enclosing the region, or by using a higher or lower than usual image intensity, or by using a color tone different from usual. In addition, an indication of a presence of Ci sets of pointing selection possible regions is also displayed (step S512).

On the other hand, after the pointer position update processing of step S501, the mode is the pointing selection possible mode, whether a current pointer position is within the video display region or not is checked next (step S513). When a current pointer position is within the video display region, the processing is terminated. Otherwise, it implies that it newly entered the pointing selection impossible state, so that the mode is changed to the pointing selection possible mode (step S514).

Then, in order to check whether there is a currently pointing selection possible object or not, whether Ci is greater than 0 or not is checked (step S515). When there is a currently pointing selection possible object. i.e., when this Ci is a positive number (step S515 YES), in order to return to the pointing selection impossible mode, the display speed is set back to the normal speed, i.e., the display speed used before it enters the pointing selection possible mode (step S516), and the special display (such as an enclosing frame) of the pointing selection possible region in the list data Di is erased (step S517). When there is no currently pointing selection possible object (step S515 NO), the processing is terminated immediately.

Next, the timer interrupt processing will be described.

Figure 7:
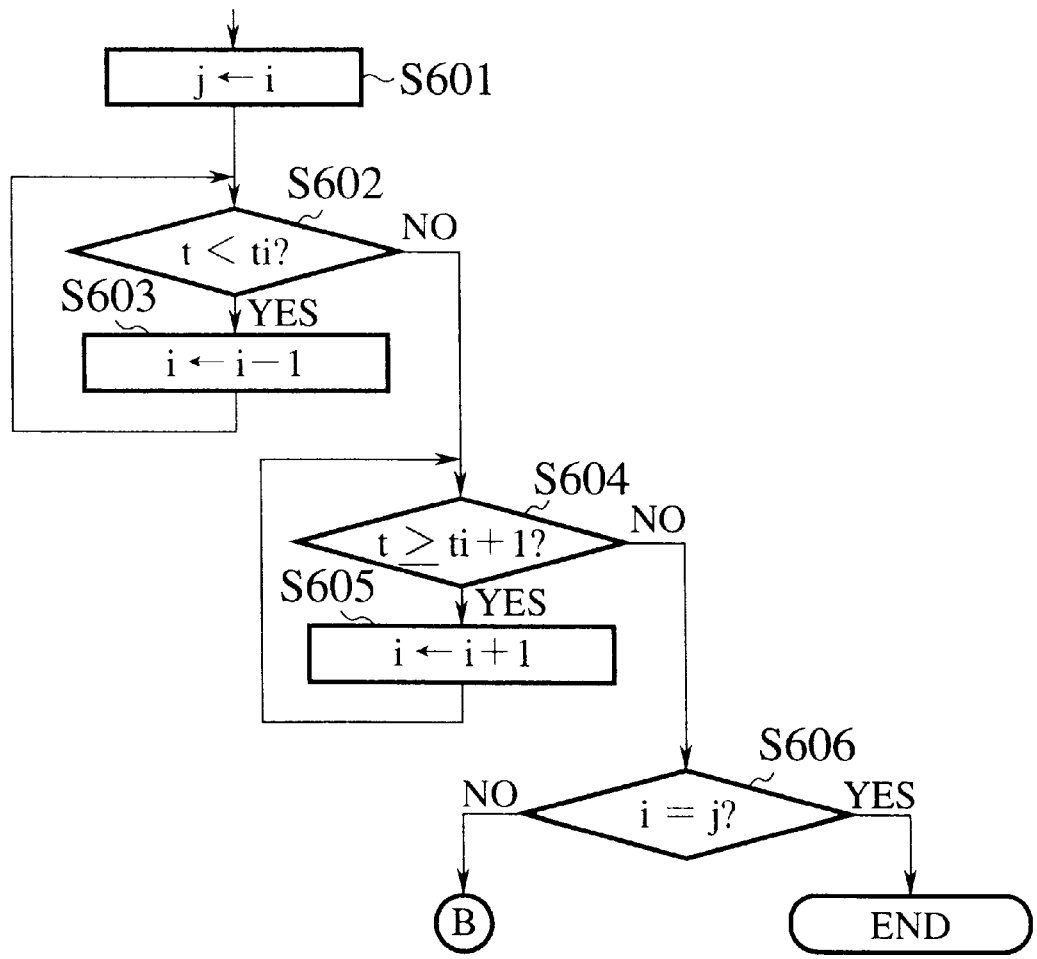
FIG. 7 and FIG. 8 are a flow chart for a timer interrupt processing by a control unit in the system of FIG. 1 in the first embodiment of the present invention.
Figure 8:
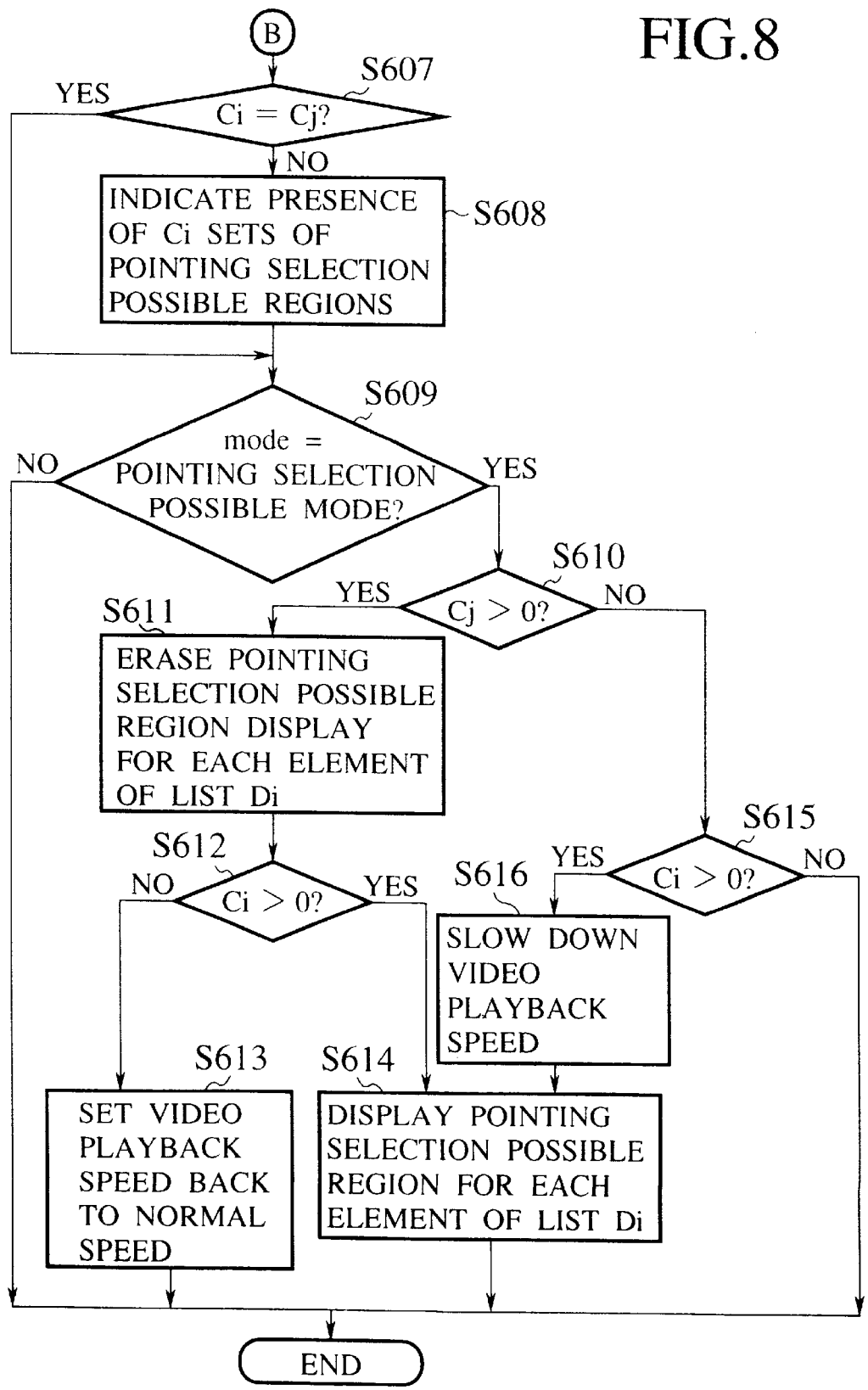

When the timer interruption occurs at the control unit 101, the control unit 101 carries out the processing according to the flow chart of FIG. 7 and FIG. 8 as follows.

First, the current data number i is saved into a variable j (step S601), and then the data number i is updated. Namely, when the time t is before the time ti of the currently referred data i (step S602 YES), the data number i is decreased (step S603), until the time ti of the data number i reaches to a time zone of the time t (step S602 NO). When the time t is after the time ti of the currently referred data i (step S604 YES), the data number i is increased (step S605), until the time ti of the data number i reaches to a time zone of the time t (step S604 NO). Then, whether the variable i is equal to the variable j or not is checked (step S606). When the variable i is equal to the variable j, i.e., when the data number is unchanged from the previous one at a time of this timer interruption (step S606 YES), the processing is terminated. When the data number is updated (step S606 NO), the following update processing is carried out.

Namely, whether Ci is equal to Cj or not is checked (step S607). if not, an indication of a presence of Ci sets of pointing selection possible regions is displayed (step S608) to indicate a change of a number of pointing selection possible regions from Cj to Ci, whereas otherwise the step S608 is skipped.

Then, whether the mode is the pointing selection possible mode or not is checked (step S609). If it is not the pointing selection possible mode (step S609 NO), the processing is terminated after the display of a number of pointing selection possible regions at the step S608. Otherwise (step S609 YES), whether Cj is greater than 0 or not is checked (S810). When Cj is greater than 0, i.e., when there was a pointing selection possible region before this routine starts (step S610 YES), the special display (such as an enclosing frame) of the pointing selection possible region in the list data Di is erased (step S611). Then, whether Ci is greater than 0 or not is checked (step S612). When Ci is greater than 0, i.e., when there is a currently pointing selection possible region (step S612 YES), the special display of the pointing selection possible region in the list data Di is displayed (step S614), whereas otherwise (step S612 NO) the video playback speed is set back to the normal speed, i.e., the display speed used before it enters the pointing selection possible mode (step S613).

On the other hand, when Cj is not greater than 0, i.e., when there was no pointing selection possible region before this routine starts (step S810 NO), whether Ci is greater than 0 or not is checked (step S615). When Ci is not greater than 0, i.e., when there is no currently pointing selection possible region (step S615 NO), the processing is terminated immediately, whereas when Ci is greater than 0, i.e., when there is a currently pointing selection possible region (step S615 YES), the video playback speed is slowed down (step S616). and the special display of the pointing selection possible region in the list data Di is displayed (step S814).

Next, the mouse click interrupt processing will be described.

Figure 9:
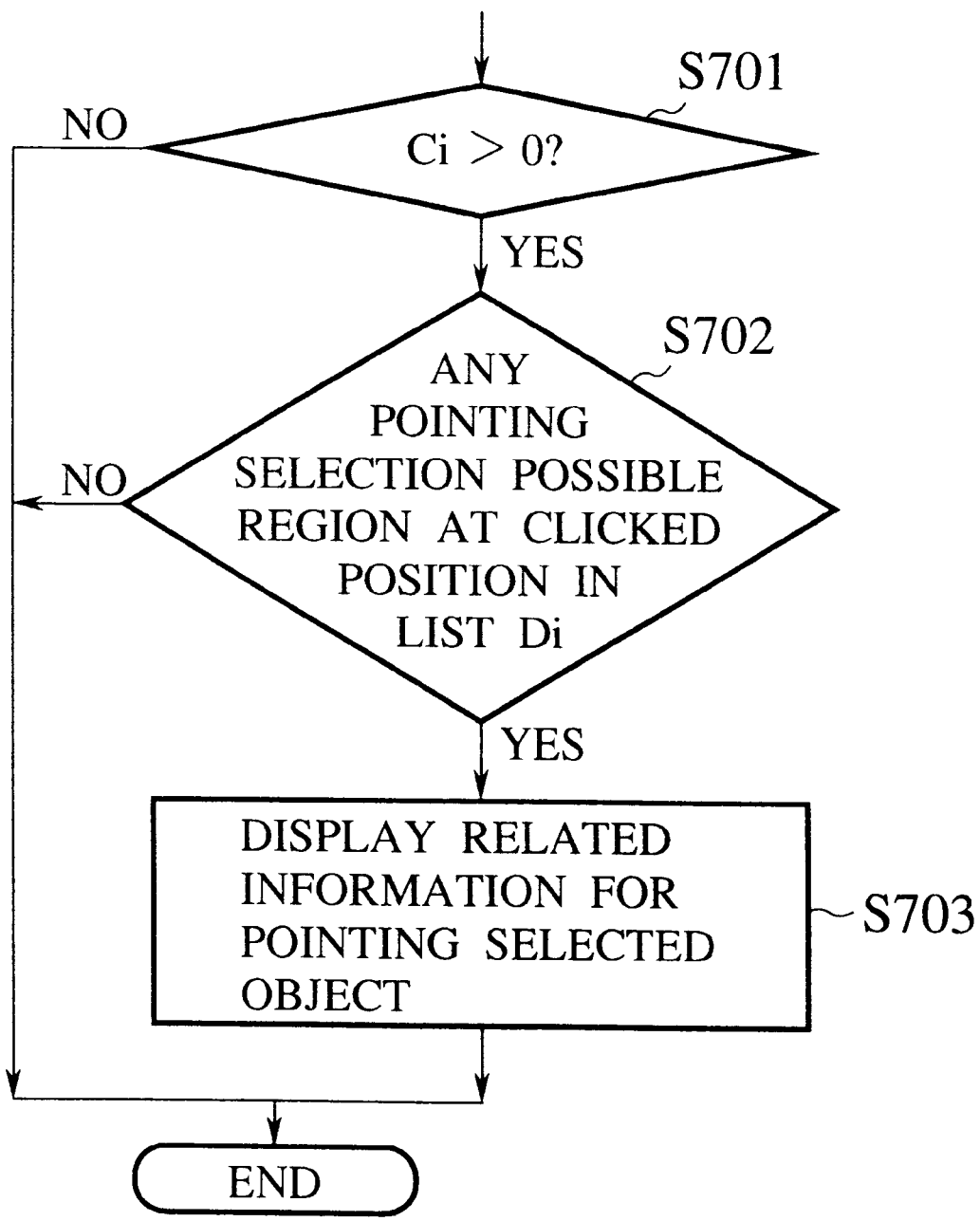
FIG. 9 is a flow chart for a mouse click interrupt processing by a control unit in the system of FIG. 1 in the first embodiment of the present invention.

When the button of the mouse 103 is depressed, the control unit 101 is interrupted, and the control unit 101 carries out the processing according to the flow chart of FIG. 9 as follows.

First, whether Ci is greater than 0 or not is checked (step S701). When Ci is not greater than 0, i.e., when there is no currently pointing selection possible region (step S701 NO), the processing is terminated immediately.

Otherwise (step S701 YES), whether there is any pointing selection possible region at a clicked position in the list data Di or not is checked (step S702), and if not (step S702 NO), the processing is terminated immediately.

Otherwise (step S702 YES), the related information for the pointing selected object is displayed (step S703).

In this routine, the data number i is not updated, because the the user's convenience can be damaged when the data number is updated in this routine. Namely, even if the time is changed and the data number is changed immediate after the button is depressed by the user, it is preferable to carry out the processing by using the old data because such a processing is more consistent with the user's sense.

Now, a form of display used in this first embodiment will be described.

Figure 10A:
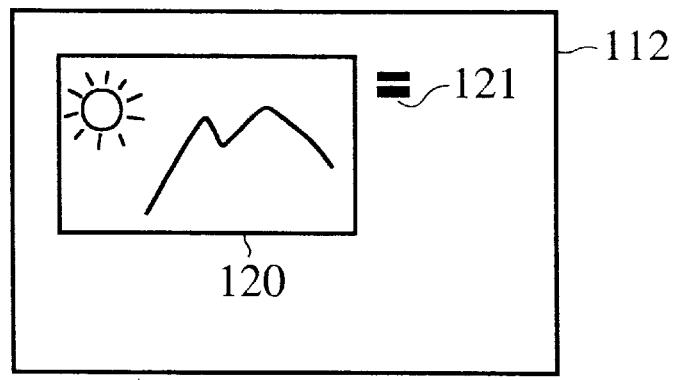
FIGS. 10A to 10D are illustrations of exemplary display screens of a display unit in the system of FIG. 1 in the first embodiment of the present invention.
Figure 10B:
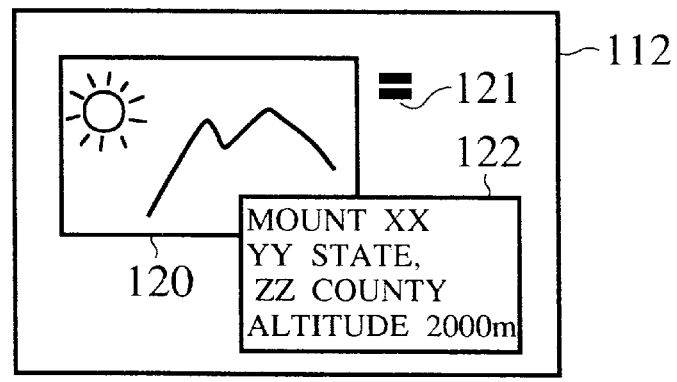
Figure 10C:
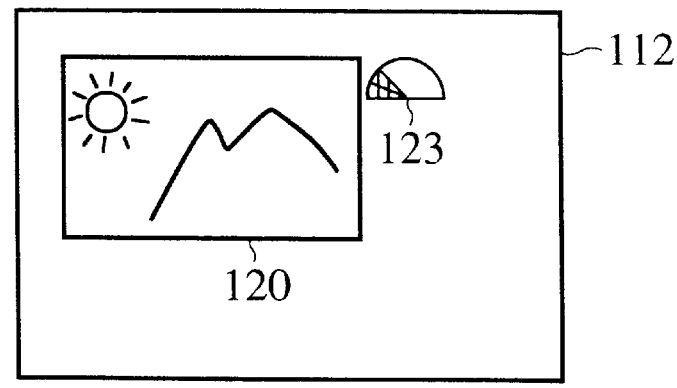
Figure 10D:
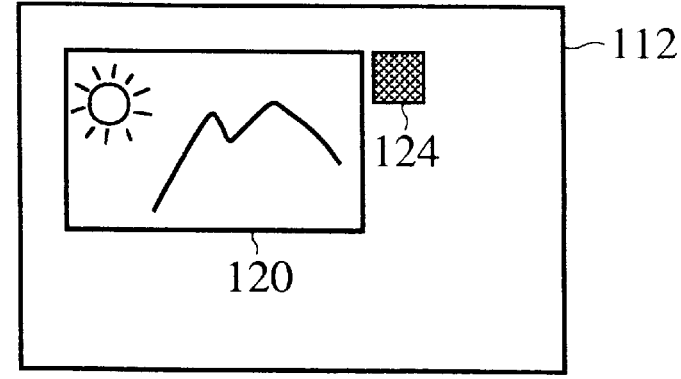

FIG. 10A shows an exemplary display screen of the display unit 112. In this display screen, a part of the display unit 112 is a video display region 120, in which a video image of a mountain and the sun is shown. Now, when the mountain is specified by the pointing selection in FIG. 10A, as shown in FIG. 10B, the related information 122 of this mountain is displayed. Similarly, when the sun is specified by the pointing selection, the related information of the sun will be displayed. In this case, there are two pointing selection possible positions from which the related information can be obtained, the display unit 112 also displays an indication 121 of this number two of the pointing selection possible positions on an upper right side of the video display region 120, where this indication 121 is given in a form of two lines. For this indication 121, it is also possible to use the other form of indication of a number, such as a display of the Arabic numeral "2", a display of a graph 123 indicating a number as shown in FIG. 10C, or a display 124 for indicating a number by using different color concentration levels or saturation levels for different numbers as shown in FIG. 10D.

In a case where there is no position from which the related information can be obtained, it is also preferable to display an indication of an absence of the pointing selection possible positions, so that the user does not have to carry out the wasteful pointing selection operation. In this case, the fact that a number of pointing selection possible positions is equal to 0 can be indicated by an absence of the display of an indication of a number of pointing selection possible positions, a display of the Arabic numeral "0", or a display of a character or an icon expressing an absence.

At this point, when the pointing selection possible positions are always displayed with the special display (such as an enclosing frame, or a different image intensity/tone) in order to make them easily recognizable by the user as in the prior art, such a special display also appears on the video image even when the user wishes to watch the video image itself so that it makes the video image hard to watch. In this regard, when the special display is used only when it is in the pointing selection possible mode as in this first embodiment, it becomes possible for a user to normally watch the video image comfortably, and the special display appears only when a user wishes to make a pointing selection on the video image.

Also, in a case of making a pointing selection on the video image, there are cases in which it is hard to make a pointing selection of a target object as this target object moves, but by slowing down the video playback speed, or even pausing the video playback once, when it is in the pointing selection possible mode as in this first embodiment, it becomes easier to make a pointing selection of a part of the video image.

In addition, in a case of making a pointing selection on the video image, it is very convenient if a user can recognize whether there is any related information for the currently watched video image or not to begin with, and in this regard, when a number of pointing selection possible positions in the currently playbacked video image is indicated as in this first embodiment, the user's feeling of convenience in use can be improved.

Second Embodiment

Referring now to FIG. 11 to FIG. 14, the second embodiment of the multimedia data display method and system according to the present invention will be described in detail.

This second embodiment is directed to a case of resolving the problem (B) mentioned above, by changing the playback speed of the source video image during the display of the related information.

Figures 11, 12:
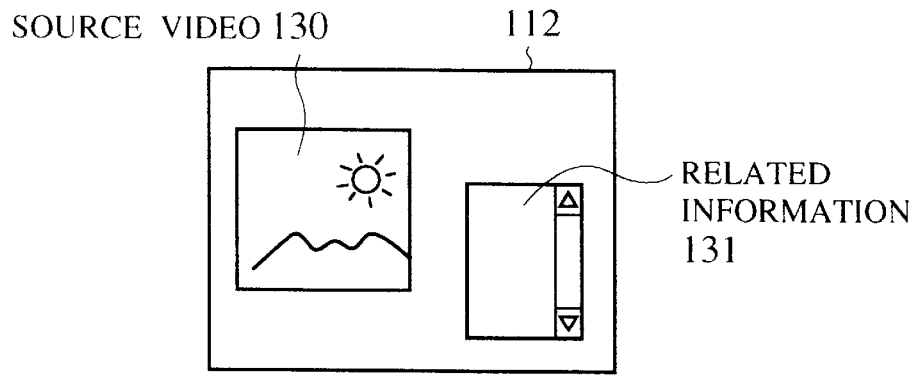
FIG. 11 is an illustration of exemplary display screen of a display unit in the system of FIG. 1 in the second embodiment of the present invention.
FIG. 12 is an illustration of an exemplary form of an information used in a control unit of the system of FIG. 1 in the second embodiment of the present invention.

FIG. 11 shows an exemplary display screen of the display unit 112 in this second embodiment. Here, the video image of a scenery is playbacked as a source video image 130, and its explanation is displayed as the related information 131 in text when a part of the source video image 130 is clicked.

In the prior art, the related information is displayed while the source video image is playbacked at the normal speed, i.e., a speed by which the motion of the objects in the video image appears natural. For this reason, in a case where the related information is a length text which requires a considerable amount of time for reading entirely, there has been a problem that the source video image proceeds too far ahead while reading the related information. In this second embodiment, when the related information is given in text, the playback of the source video image is paused or slowed down, so that the user can obtain all the information obtainable from the source video image.

FIG. 12 shows an exemplary form of an information held in the control unit 101 in order to realize the above described control. This information includes a time since the playback start time of the source video image, a region of the source video image to which each related information is attached, a type of each related information, a display time required for each related information, and an address in the secondary memory at which each related information is stored. Here, it is assumed that the control unit 101 has a timer for counting a time since the playback start time of the source video image.

Now, the operation of the control unit 101 in a case of displaying the related information in this second embodiment will be described with reference to the flow chart of FIG. 13.

When a command from a user is received (step S1), the control unit 101 measures a current time by using a timer provided therein (step S2). Then, the control unit 101 identifies the source video image in which the user made the pointing selection and a type of the corresponding related information, by using an information on the pointing selection (step S3). This identification can be done by using a table shown in FIG. 12. Then, the playback speed of the source video image during the display of the related information is determined according to a type of the related information (step S4).

When it is determined that the playback of the source video image is to be stopped (Step S5 YES), the playback of the source video image is stopped (step S7), whereas otherwise (step S5 NO), the playback speed of the source video image is slowed down (step S6). Then, the related information is displayed (step S8).

Figures 13, 14:
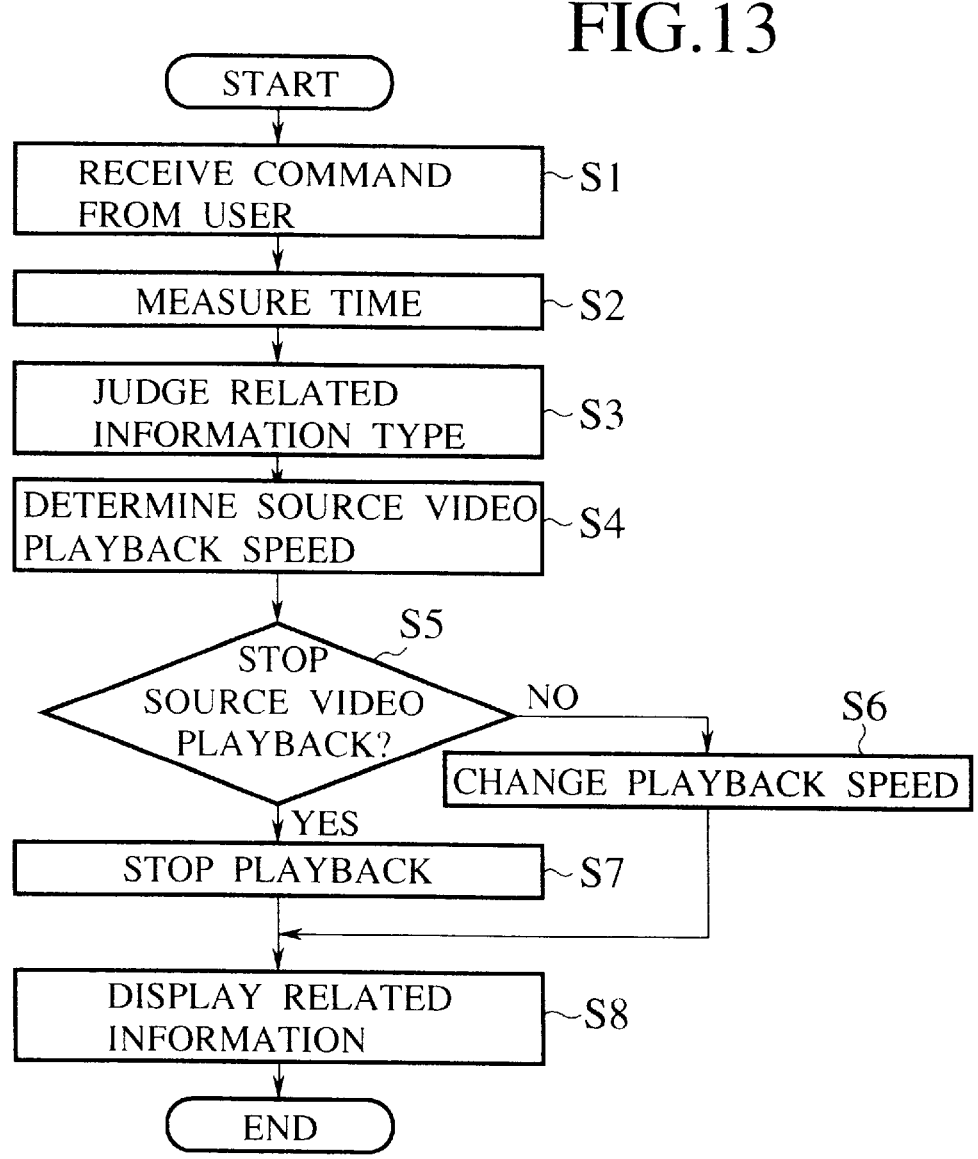
FIG. 13 is a flow chart for the operation of a control unit in a case of displaying the related information in the second embodiment of the present invention.
FIG. 14 is an illustration of a table used in a control unit of the system of FIG. 1 in the second embodiment of the present invention.

In this second embodiment, the control unit 101 has a table as shown in FIG. 14, which specifies the source video playback speed in correspondence to a type of the related information in advance. Namely, it is determined in advance that, when the related information is text data, the source video image is to be stopped, And when the related information is video data or static image data, the source video playback speed is to be reduced to ½ of the normal speed. In the example of FIG. 11, the related information is text data, so that the playback of the source video image is going to be stopped. In this case, the related information is displayed while the source video image is stopped.

Next, an alternative case of this second embodiment will be described. This is a case in which it is suitable to playback the source video image at high speed during the display of the related information. This case will be described by using an example of a virtual travel experience system. In this example, the user can obtain information regarding the sightseeing spots while watching the source video image of a virtual scenery by clicking a part of the source video image.

In the prior art system in which the video image of a scenery is playbacked as the source video image and a user can obtain the explanation of the sightseeing spots as the related information by making pointing selections, when the video image of the intermediate scenery portion is shortened, it is difficult for a user to experience a feeling of a real travel. On the other hand, when the video image of the intermediate scenery portion is long, a user can be bored. In addition, when the video image of the scenery portion is playbacked at high speed, it becomes impossible to make a pointing selection, so that the user is forced to keep watching the scenery portion even when it is a less interested scenery portion for the user.

In this regard, in this second embodiment, the playback of the source video image is moved forward at high speed up to a portion near the sightseeing spot at which the next related information can be obtained, during the playback time of the previous related information in a case the previous related information is video data, or during a prescribed period of time in a case the previous related information is static image data or text data, so that a user can obtain the information on the sightseeing spots efficiently, while experiencing a feeling of a real travel.

This alternative case of the second embodiment differs from a previously described case at a part for determining the playback speed of the source video image. This part of the operation in this alternative case will now be described.

When a pointing selection with respect to the source video image is made by the user, the control unit 101 reads the time from the timer at that point, and this time is set as t0. Then, the control unit 101 reads the time (t1) of the related information which appears next and the display time (t2) required for displaying that related information from the table shown in FIG. 12. Here, the required display time is set to be equal to the playback time when the related information is video data, while the required display time specifies how long the related information should stay on the display in a case the related information is static image data or text data.

Then, a time t3 required for reaching to the time t1 of that related information, i.e., $t3=t1-t0$, is calculated. Then, the source video image is playbacked at a speed equal to t3/t2 times the normal speed, for a period of time equal to t2. By this control, the display of the source video image near the next pointing selection possible position for the next related information can be started when the display of the previous related information is finished.

Here, the playback speed of the source video image may not necessarily be exactly t3/t2 times the normal speed, and it is possible to start the display of the source video image near the next pointing selection possible position after a while since the display of the previous related information is finished.

It is also possible to adopt a scheme in which the playback speed equal to t3/t2 times the normal speed is used when $t3 \geq t2$, and whereas the playback at the normal speed for a period of time equal to t2 followed by the pause for a period of time equal to t3−t2 is used when t3<t2. In this case, there is an advantage in that, when the user stops the display of the related information within a period of time equal to t2 while t3<t2, the source video image playbacked at the normal speed will be shown to the user, without showing any source video image playbacked at slow speed.

Third Embodiment

Referring now to FIG. 15 to FIG. 18, the third embodiment of the multimedia data display method and system according to the present invention will be described in detail.

This third embodiment is directed to a case of resolving the problem (B) mentioned above, by changing the display mode of the related information according to a command from a user.

This third embodiment will now be described for an exemplary case of a system in which the video image of a plurality of persons is displayed at a part of the display unit 112, and when a user males a pointing selection of a particular person, the video image of that person's representative speech is playbacked as the related information. Here, when the user makes the pointing selection of a particular person, only an initial scene of the video image of that person's representative speech is displayed and the video playback does not start until a command from a user is received.

FIG. 15 shows an exemplary display screen of the display unit 121 immediately after the user made the pointing selection of a particular person from a source video image 132. In this third embodiment, when the related information 133 is video data, only the initial scene is displayed and the video playback does not start. Then, when the user clicks a playback button 134 shown in FIG. 15, the video playback is started.

In the prior art, when the related information selected by the user is video data, the related information is automatically playbacked. Consequently, when the user Judged the related information as unnecessary after the related information is displayed, it has been necessary for the user to carry out the operations to stop the playback of the related information and finish the display of the related information, but there has been a problem that these operations can be found by the user as quite unnecessary procedures which are particularly tedious when the user is searching for a certain necessary related information.

In this third embodiment, after the related information is displayed, the user can make a selection as to whether that video data are to be playbacked or not, so that when it is judged unnecessary to playback that video data, it is possible to return to the source video image by simply finishing the display of the related information immediately, so that the tediousness felt by the user can be reduced even in a case where the user is searching for a certain related information, In this third embodiment, the control unit 101 holds a table as shown in FIG. 16, for example. This table of FIG. 16 registers a time since the playback start time of the source video image, a related information display region for displaying each related information, a type of each related information, a display time required for each related information, and an address in the secondary memory at which each related information is stored. By using this table of FIG. 16, a type of related information can be easily identified according to a command from the user. For example, when the user enters a command within a related information display region 135 given by a rectangle defined by diagonal corners at (x0, y0) and (x1, y1) at a time to after the playback start time of the source video image as shown in FIG. 17, it can be recognized from the table of FIG. 16 that the video data is to be playbacked as the related information, the playback time of Tx will be required to playback that video data, and this video data can be read out from an address 0xFF10FD in the secondary memory. Whether this command is for the source video image or not can be easily Judged by holding the information on coordinates of regions in the source video image as well.

Now, the operation of the control unit 101 at a time of displaying the related information in this third embodiment will be described with reference to the flow chart of FIG. 18.

When a command from a user is received (step S9), whether it is a command for the related information or a command for the source video image is judged (step S10).

When it is a command for the source video image, whether it is a command for a display of the related information or not is Judged (step S14), and if not (step S14 NO), this command is executed (step S13) and a next input from a user is awaited. When it is the command for a display of the related information (step S14 YES), whether the related information is video data or not is judged from the current time and the table of FIG. 10 (step S17). When the related information is not video data (step S17 NO), the related information is displayed (step S16) and a next input from the user is awaited. When the related information is video data (step S17 YES), only the initial scene is displayed (step S19) and a next input from the user is awaited.

When a command from the user is a command for the related information, whether the currently displayed related information is video data or not is judged (step S11). When the related information is not video data (step S11 NO), this command is executed (step S12) and a next input from the user is awaited. When the related information is video data (step S11 YES), whether this command is a command for starting the playback of video data or not is judged (step S15). When this command is a command for starting the playback of video data (step S15 YES), the playback of the video data is started (step S18), and otherwise (step S15 NO), this command is executed (step S12) and a next input from the user is awaited.

Fourth Embodiment

Referring now to FIGS. 19A to 19C and FIG. 20, the fourth embodiment of the multimedia data display method and system according to the present invention will be described in detail.

This fourth embodiment is directed to a case of resolving the problem (B) mentioned above, by changing the display mode of the related information according to a command from a user. In this fourth embodiment, when the related information is video data, the initial scene is displayed and the playback is immediately started, but the video data is playbacked at a lower or higher speed than the normal speed.

Figure 19A:
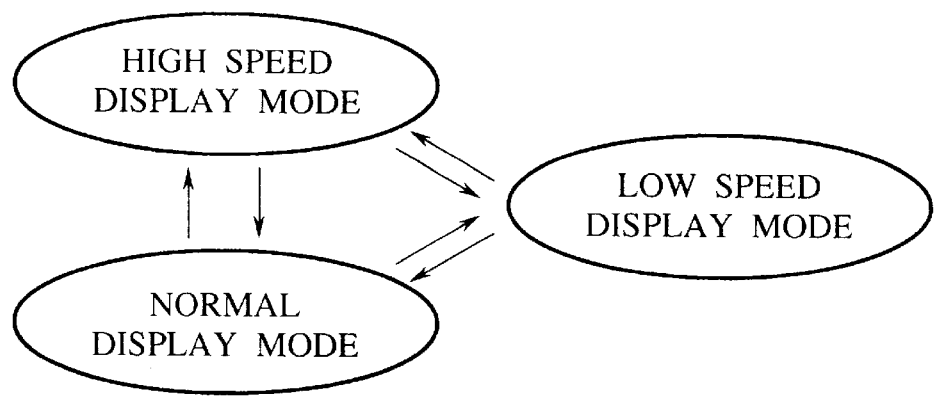
FIGS. 19A, 19B and 19C are diagrams showing three manners of transition among different display modes used in the system of FIG. 1 in the fourth embodiment of the present invention.
Figure 19B:
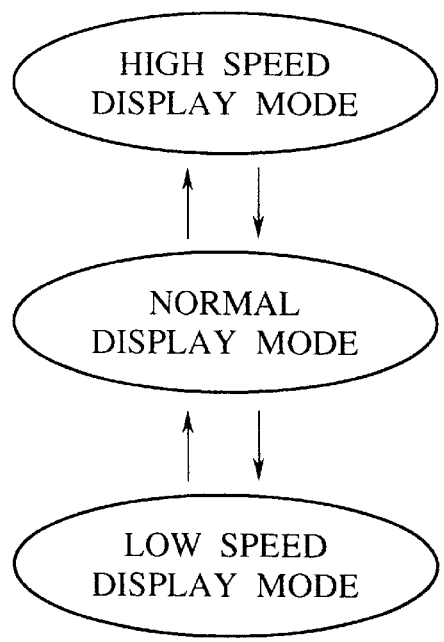
Figure 19C:
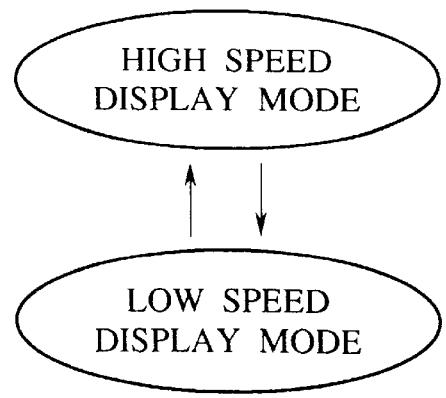

In this fourth embodiment, the system has a mode for displaying the related information a lower or higher speed than the normal speed, in addition to a mode for displaying the related information at the normal speed. A transition to the high speed or low speed display mode is made according to a command from the user. Here, the transition among different display modes can be made as shown in FIG. 19A or FIG. 19B in a case of incorporating the normal display mode in the transition, or as shown in FIG. 19C in a case of not incorporating the normal display mode in the transition.

In the prior art, when the user tries to search for the video data that had been obtained as the related information before, the user had no choice but to display and look through every related information which has a possibility for being the desired one, because no video search means was available. For this reason, it has been impossible for the user to obtain the desired information unless the user playbacks and looks through all the related information, and there has been a problem that it requires an enormous amount of time and efforts to obtain the desired information.

However, in such a case where the primary objective to search out a particular related information, there is no need for the video data to be playbacked at the normal speed, so that in this fourth embodiment, it is made possible to realize a faster search by making a transition to the high speed display mode, so as to reduce the time and efforts of the user required for the search considerably.

Also, in the prior art, the related information can be displayed only at a constant speed, so that it has been impossible to satisfy the user s desire to see a certain portion carefully, such as a desire to see a certain movement in the slow motion.

In this fourth embodiment, by incorporating the low speed display mode, it is made possible to playback the video data of a desired related information in slow motion by making a transition to the low speed display mode.

In this fourth embodiment, whether to playback the video data at the normal speed, at the high speed, or at the low speed is changed according to a command from the user. The control unit 101 holds an information as to which display mode is currently selected. In addition, the control unit 101 has the information similar to that shown in FIG. 12 described above in the second embodiment. By using this information, it is possible to identify a type of the related information similarly as in the second embodiment.

Figure 20:
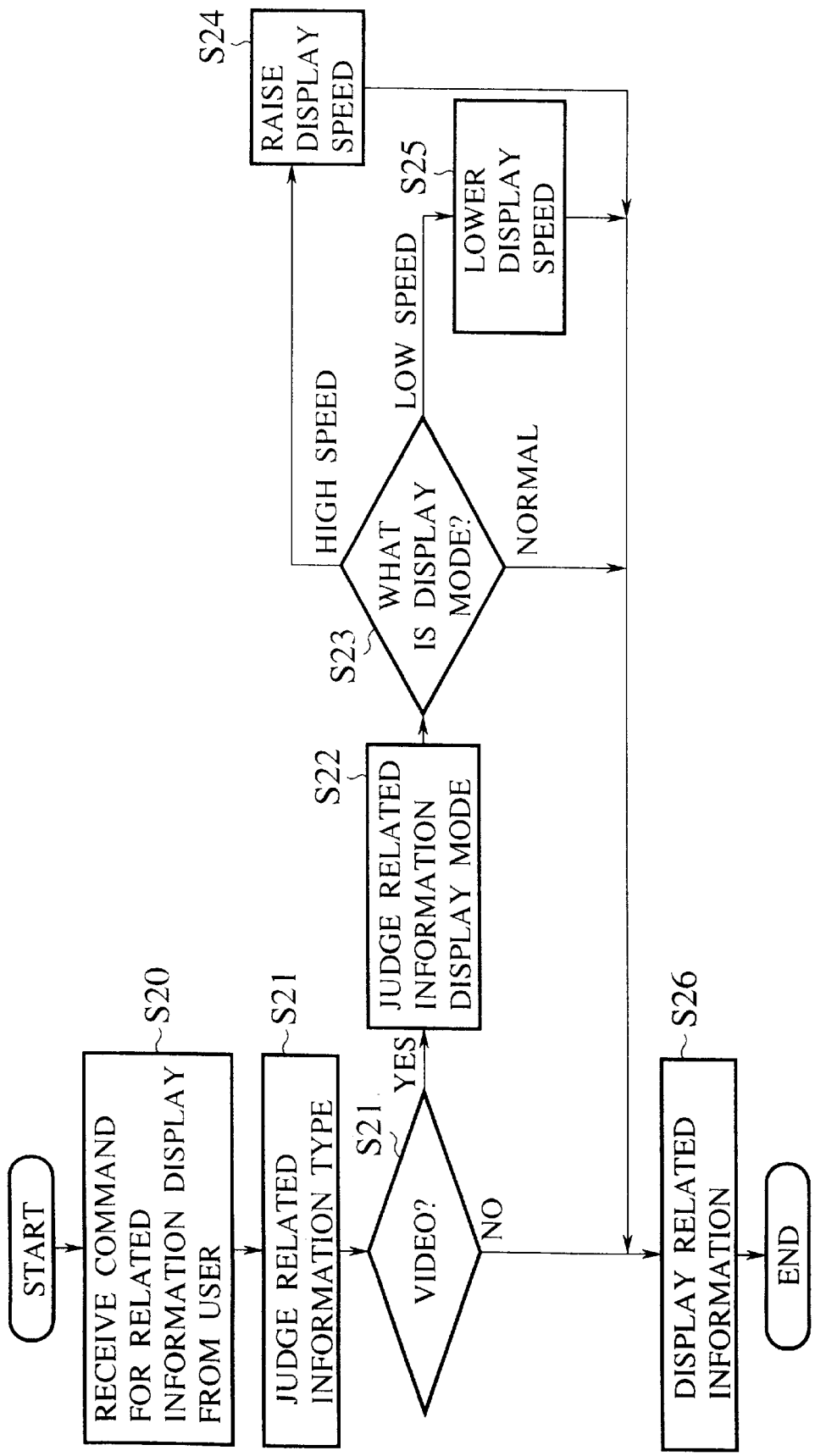
FIG. 20 is a flow chart for the operation of a control unit in the system of FIG. 1 in the fourth embodiment of the present invention.

Now, the operation of the control unit 101 in this fourth embodiment will be described with reference to the flow chart of FIG. 20.

When a command for a display of the related information from the user is received (step S20), the control unit 101 Judges a type of the related information, i.e., whether the related information is video data or not (step S21).

When the related information is video data (step S21 YES), the control unit 101 judges the display mode currently specified as the related information display mode, according to the information stored therein (step S22). When the currently specified display mode is the high speed display mode, the display speed is raised (step S24), and when the currently specified display mode is the low speed display mode, the display speed is lowered (step S25). When the currently specified display mode is the normal display mode, no action takes place. Then, the related information is displayed in the specified display mode (step S26).

When the related information is not video data (step S21 NO), the related information is simply displayed (step S26).

Fifth Embodiment

Referring now to FIG. 21 to FIG. 25, the fifth embodiment of the multimedia data display method and system according to the present invention will be described in detail.

This fifth embodiment is directed to a case of resolving the problem (B) mentioned above, in which the related information specified by the pointing selection by the user changes along with the change of the source video image in which the pointing selection is made. In addition, after the display of the related information is over, a display screen of that related, information is automatically iconized, and when that icon ii opened again, the related information in accordance with the state of the source video image at a time of opening the icon will be displayed.

In the prior art, when the same object such as a person or a building in the source video image has a plurality of different related information at different times, these plurality of related information are not displayed unless the user makes the pointing selection of each one of these plurality of related information. Also, when the display of the related information is over, the display screen of that related information is erased either automatically or according to a command from the user. For this reason, when the user tries to obtain the related information at different timings, it has been necessary for the user to carry out the operations to make the pointing selection of the desired related information and to erase the display screen of each related information at each timing, and these operations have been very tedious. On the other hand, when the display screen of the related information is iconized, the content of the iconized display screen remains the same as the related information displayed when this display screen was iconized, so that when it is desired to display a series of the related information at different timings, it has been necessary to carry out the operation to make the pointing selection of each related information anew.

In this fifth embodiment, once the display screen for the related information is opened, all the related information for the same source video image at different timings which are linked with each other are automatically displayed, and even when this display screen is iconized, the related information synchronized with the source video image will be displayed when the iconized display screen is opened again, so that the time and efforts required for the user can be reduced.

Figure 21:
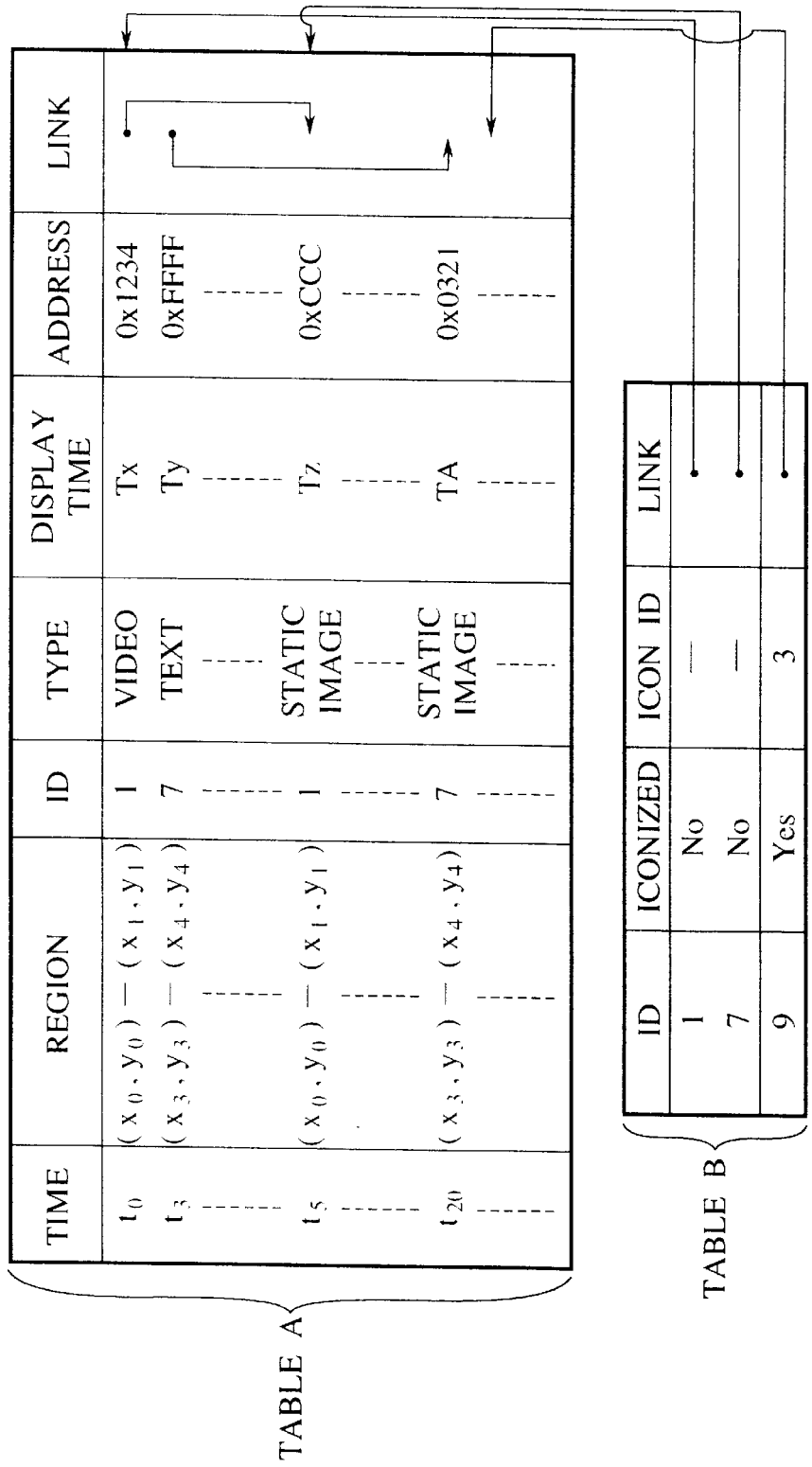
FIG. 21 is an illustration of an exemplary data used in a control unit of the system of FIG. 1 in the fifth embodiment of the present invention.

FIG. 21 shows data held in the control unit 101 in this fifth embodiment.

In FIG. 21, a table A stores a time and a region at which a pointing selection can be made, a type of corresponding related information, a display time of each related information, an address of each related information in the secondary memory, and an ID for uniquely identifying an object (such as a person or a building) in the source video image to which each related information is attached. Then, when the same object identified by the identical ID has more than one related information at different times, links are set up among these more than one related information. By tracing these links, it is easily possible to calculate a time until the next related information for the same object with the same ID.

Also, in FIG. 21, a table B stores IDs of the objects in the source video image which are currently displayed in synchronization, an information as to whether a display screen for each entry is iconized or not, an ID for identifying each icon in a case a display screen is iconized, and a link from each entry to a currently displayed related information in the table A.

In addition, the control unit 101 stores a time To at which the related information to be updated in synchronization should be updated in the nearest future. An initial value of this time To is set to $\infty$.

Now, the operation of the control unit 101 in this fifth embodiment will be described with references to the flow charts of FIG. 22, FIG. 23, FIG. 24, and FIG. 25.

Figure 22:
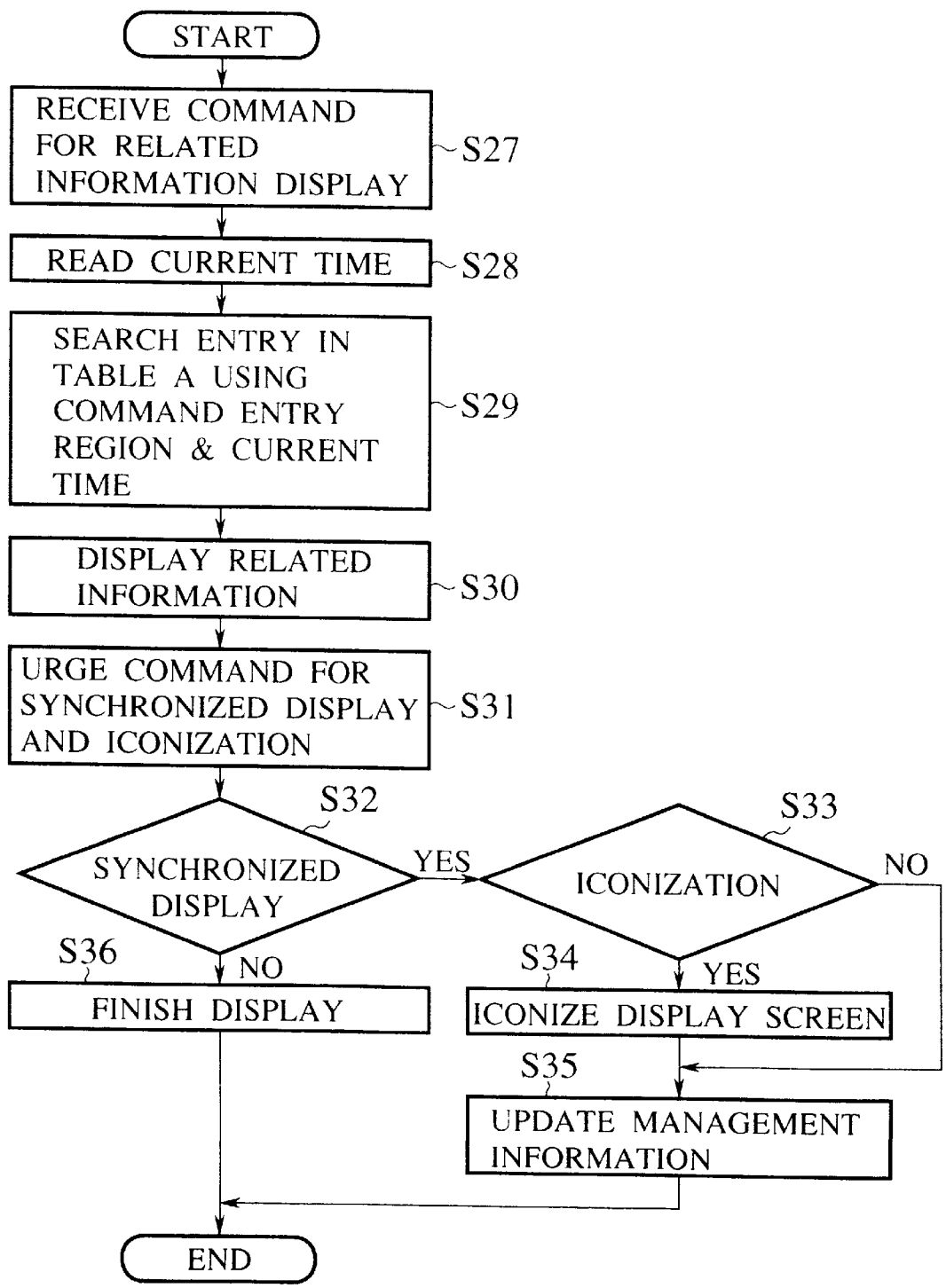
FIG. 22 is a flow chart for the operation of a control unit in the system of FIG. 1 in a case where a command for displaying a related information is received in the fifth embodiment of the present invention.

First, the operation of the control unit 101 in a ease where a command for displaying the related information is received will be described according to the flow chart of FIG. 22.

When a command for displaying the related information is received from the user (step S27), the control unit 101 reads a current time from a timer provided therein (step S28). Then, using an information on the current time and a position of the region at which the command is entered, the control unit 101 determines the address in the secondary memory from which the related information should be read out by searching through the table A of FIG. 21 (step S29), and displays the related information by reading out data from the determined address in the secondary memory (step S30).

When the display of this related information is finished, the control unit 101 urges the user to command whether the display of this display screen should be continued in synchronization or not, and in a case of continuing, whether this display screen should be kept open or iconized (step S31). When the user commanded the synchronized display (step S32 YES) and the iconization (step S33 YES), the display screen of this related information is iconized (step S34), whereas when the user commanded the synchronized display (step S32 YES) and no iconization (step S33 NO), the display screen of this related information is left open as it is. Then, the management information including the tables A and B of FIG. 21 and the time To are updated (step S35). On the other hand, when the user commanded no synchronized display (step S32 NO), the display of this related information is finished (step S38).

Figure 23:
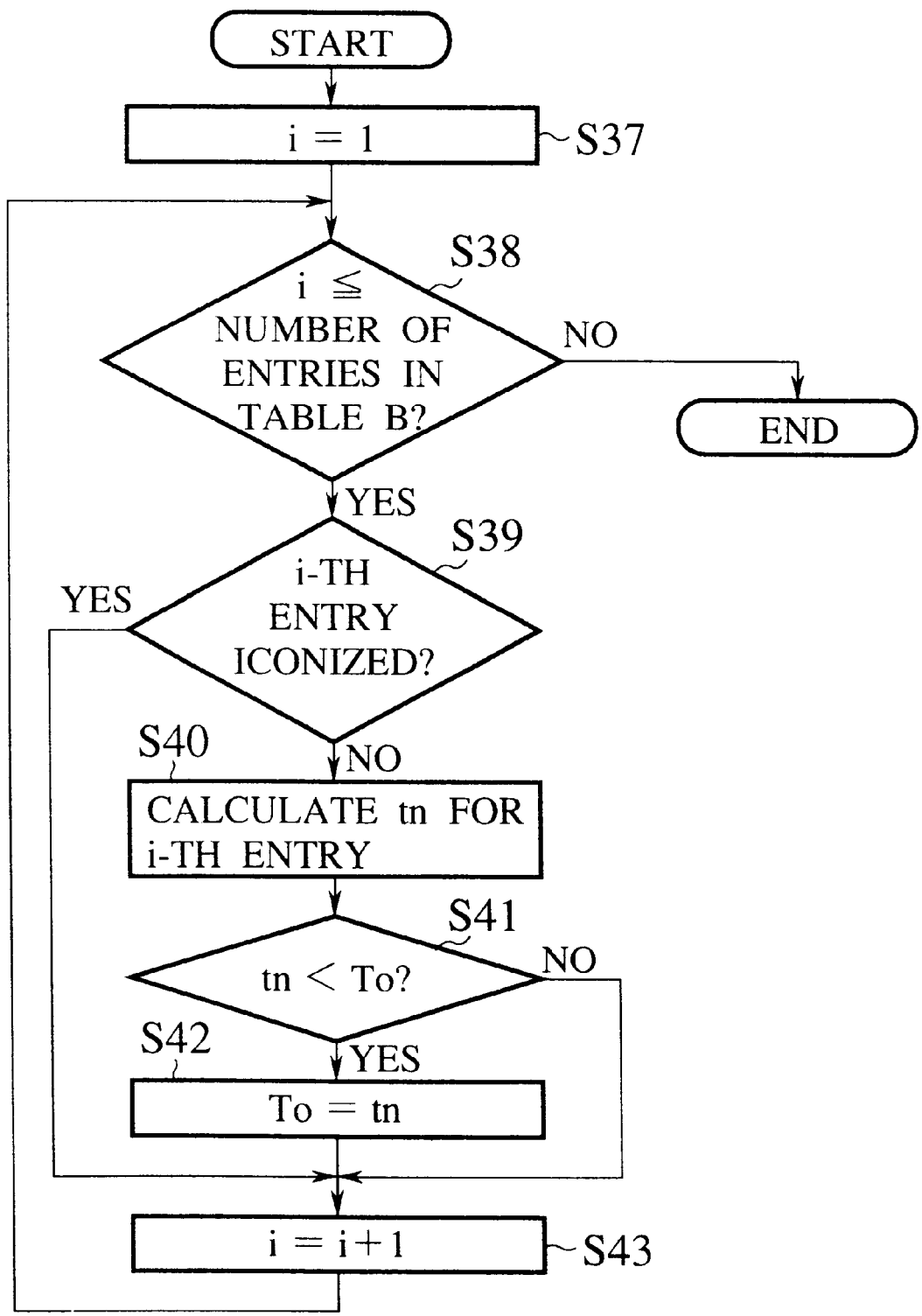
FIG. 23 is a flow chart for the operation to update a value of a time To used in a control unit of the system of FIG. 1 in the fifth embodiment of the present invention.

Next, the operation of the control unit 101 to update a value of the time To will be described according to the flow chart of FIG. 23.

First, a variable i is set equal to 1 (step S37). Then, whether this variable i is greater than a number of entries in the table B of FIG. 21 or not is judged (step S38). When this variable i is greater than a number of entries in the table B of FIG. 21 (step S38 NO), the operation is terminated. Otherwise (step S38 YES), whether the i-th entry of the table B in FIG. 21 is iconized or not is judged (Step S39). When the i-th entry is iconized (step S39 YES), the variable i is incremented by one (step S43), and the operation returns to the step S38. When the i-th entry is not iconized (step S39 NO), a time .tn at which the related information corresponding to the i-th entry is to be updated next is calculated by tracing the link of the i-th entry in the table A of FIG. 21 (step S40). Then, this time tn is compared with the time To (step S41), and when tn<To (step S41 YES), the time To is set equal to tn (step S42), the variable i is incremented by one (step S43), and the operation returns to the step S38. When tn≧To (step S41 NO), the variable i is incremented by one (step S43), and the operation returns to the step S38.

Figure 24:
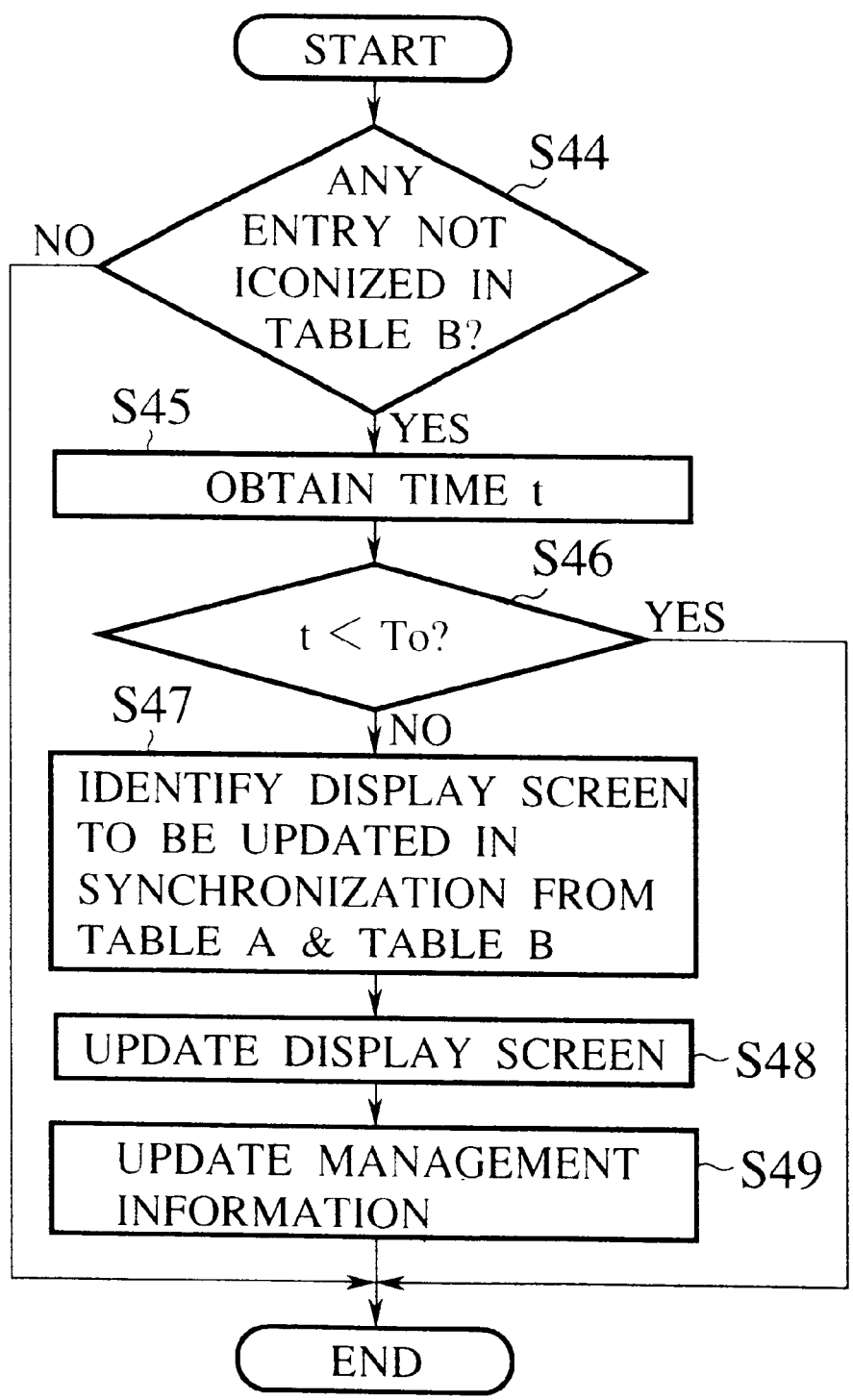
FIG. 24 is a flow chart for the operation to synchronize a related information in a control unit of the system of FIG. 1 in the fifth embodiment of the present invention.

Next, the operation of the control unit 101 to synchronize the related information in a case where the related information to be displayed in the synchronized display exists and its display screen is left open will be described according to the flow chart of FIG. 24.

Th control unit 101 constantly checks whether there is any entry in the table B of FIG. 21 which is not iconized at each time (step S44). When all the entries are iconized (step S44 NO), the control unit 101 does not make any action. When there is an entry which is not iconized (step S44 YES), the control unit 101 obtains its time t (step S45), and checks whether this time t is smaller than the time To (step S46). When t<To (step S46 YES), the control unit 101 does not make any action, whereas when t≧To (step S46 NO), the control unit 101 identifies the display screen to be updated in synchronization from the tables A and B of FIG. 21 (step S47), and updates the display screen of the corresponding related information (step S48). Here, the update implies a display of data when the related information is static image data or text data, or a start of playback of video data when the related information is video data. Then, the management information including the tables A and B of FIG. 21 and the time To are updated (step S49).

For example, in an example shown in FIG. 21, the control unit 101 traces the links from the entries of the related information IDs "1" and "7" in the table B and the corresponding links in the table A, and recognizes that the earliest next update of the related information display occurs for the ID "1" at a time t5. Consequently, there is no need for the control unit 101 to make the synchronization until the time t5 so that the source video image and the related information image are simply displayed until the time t5. At the time t5, the control unit 101 loads the related information from an address 0xCCCC and displays this related information. At the same time, the link from the table B of FIG. 21 is changed to point a position of the time t5 in the table A of FIG. 21. By carrying out this control, it is possible to realize the synchronization.

Figure 25:
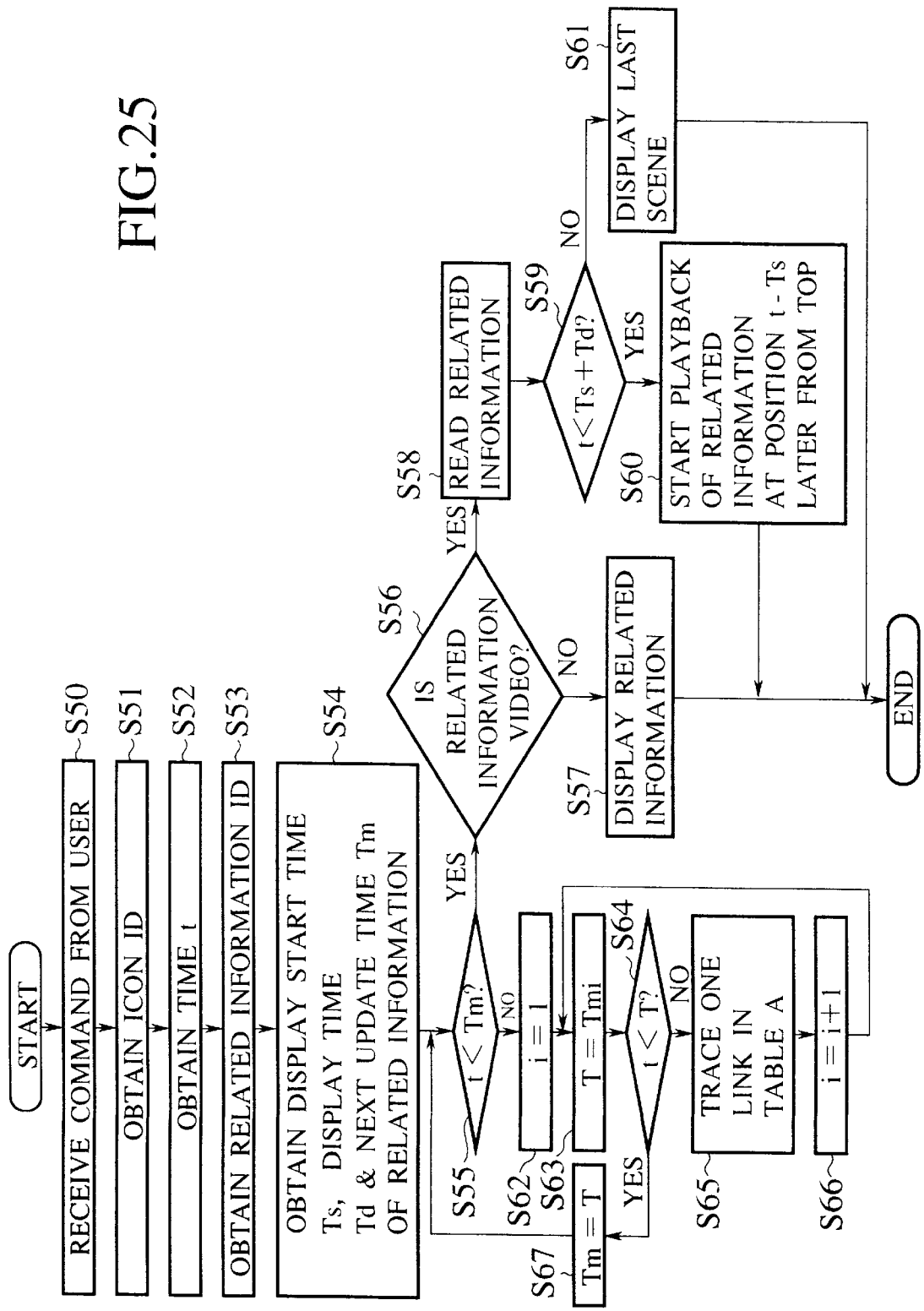
FIG. 25 is a flow chart for the operation of a control unit in the system of FIG. 1 in a case of opening an iconized related information in the fifth embodiment of the present invention.

Next, the operation of the control unit 101 in a case of opening the iconized related information will be described according to the flow chart of FIG. 25.

When a command for opening the icon is received from the user (step S50), the ID for uniquely identifying that icon is obtained (step S51), and the current tine t is obtained (step S52). Then, the ID for identifying the related information corresponding to that icon is obtained from the table B of FIG. 21 (step S53), and the display start time Ts, the display time Td, and next update time Tm of the related information corresponding to that icon are obtained by tracing the link from the table B of FIG. 21 to the table A of FIG. 21 (step S94).

Then, whether t is smaller than Tm or not is checked (step S55), and when t<Tm, whether the related information is video data or not is checked (step S56). When the related information is static image data or text data, the content of the related information is displayed (step S57). When the related information is video data, the related information is read out from the secondary memory (step S58), and whether t is smaller than Ts+Td or not is checked (step S59). When t<Ts+Td, the playback is started at a time t−Ts from a top of the related information (step S60), whereas when t>Ts+Td, the last scene of the video data is displayed (step S61).

When t≧Tm, there is a need to trace the link in the table A of FIG. 21. First, a variable i is set equal to 1 (step S62), and a time T is set equal to Tmi (step S63) where Tmi is a next update time of the i-th entry for the related information under consideration which is obtained by tracing the link from the entry in the table B of FIG. 21. Then, this time T is compared with the current time t (step S64). When t≧T, one link in the table A of FIG. 21 is traced (step S65), the variable i is incremented by one (step S66), and the operation returns to the step S63. When t<T, the next update time Tm is set equal to the time T (step S66) and the operation returns to the step S55. In this manner, it is possible to display the related information corresponding to the time at which the icon is opened.

Next, the operation at a time of iconizing the related information which is currently left open will be described.

When a command for iconization is received, the current time t is obtained, and the corresponding display screen is iconized. Then, an entry corresponding to the display screen of that related information is selected from the table A of FIG. 21, and the entry in the table B of FIG. 21 corresponding to the ID given in the selected entry of the table A of FIG. 21 is set to indicate that it is iconized and register the ID of that icon.

By the operations described above, it becomes possible to display the related information in synchronization with the corresponding source video-image, and even when the related information is iconized, when the icon is opened, this related information can be displayed in synchronization with the corresponding source video image.

Sixth Embodiment

Referring now to FIG. 26 to FIG. 35, the sixth embodiment of the multimedia data display method and system according to the present invention will be described in detail.

This sixth embodiment is directed to a case of resolving the problem (A2) mentioned above.

Figure 26:
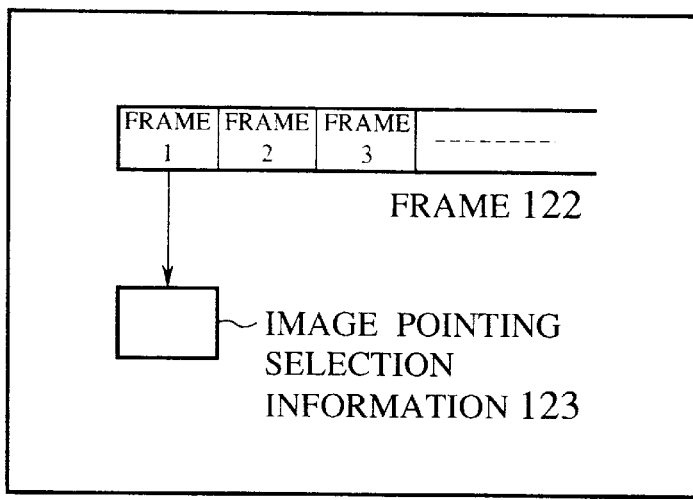
FIG. 26 is an illustration of an exemplary video data stored in a secondary memory unit of the system of FIG. 1 in the sixth embodiment of the present invention.

In the multimedia data display system of FIG. 1, as described above, the video data are taken out from the secondary memory device 107 which is locally connected to this system or from the secondary memory device 108 of the external device 113 which is connected to this system through the network. As shown in FIG. 26, the video data are stored in the secondary memory device 107 or 108 by being divided in units of frames 122. The playback of the video image is realized by sequentially displaying these frames continuously in time. The frame 122 contains the video image data, and in addition, an image pointing selection information 123 to be used in making a pointing selection of each video image is attached to some frame 122.

Figure 27:
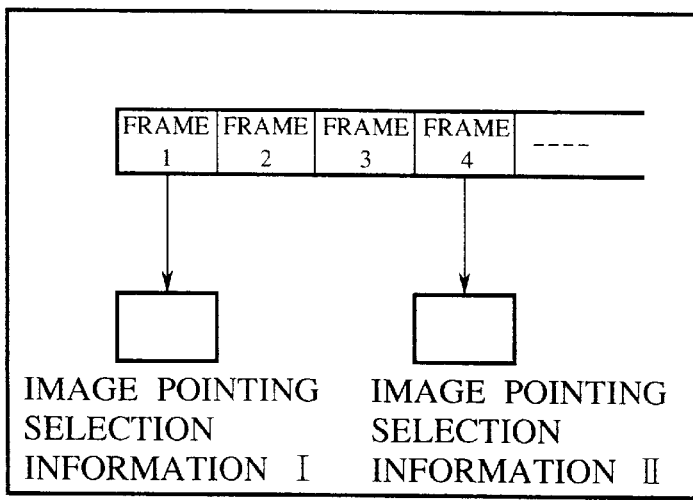
FIG. 27 is an illustration of another exemplary video data stored in a secondary memory unit of the system of FIG. 1 in the sixth embodiment of the present invention.
Figure 28:
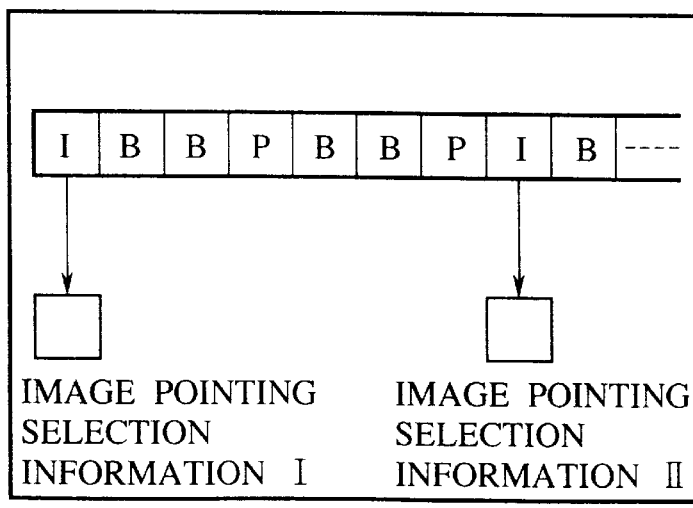
FIG. 28 is an illustration of another exemplary video data stored in a secondary memory unit of the system of FIG. 1 in the sixth embodiment of the present invention.

In this system, at a time of storing the video image data into the local or remote secondary memory device 107 or 108, the image pointing selection information is attached, not to every frame, but to one frame in every several frames, as shown in FIG. 27. For example, in a case of storing the video image in the MPEG format, the image pointing selection information is attached only to the I frame and not to the P frame and the B frame, as shown in FIG. 28.

Figure 29:
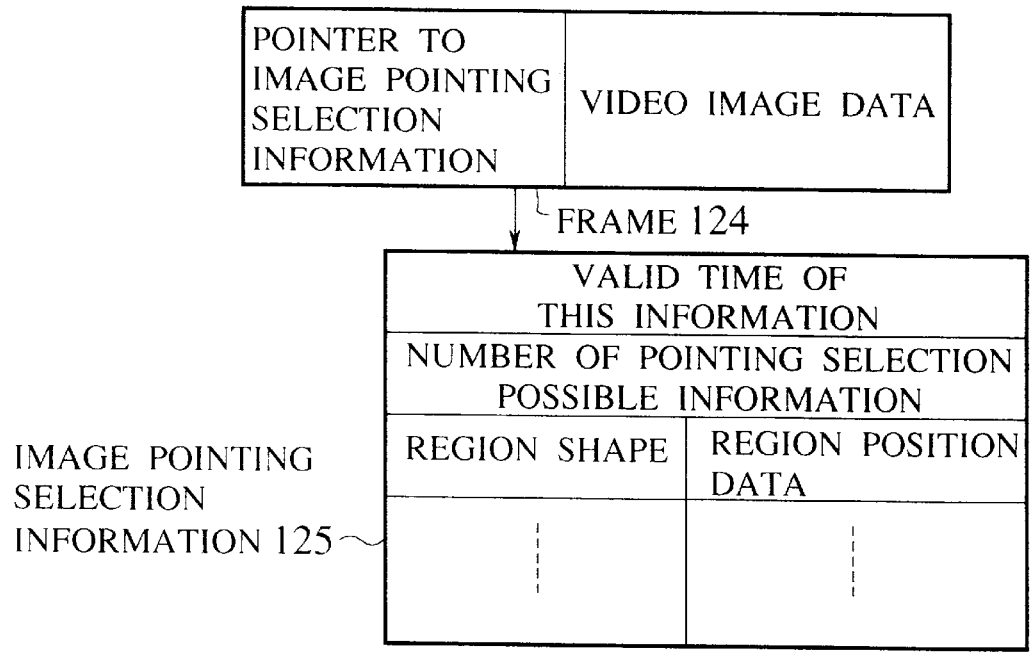
FIG. 29 is an illustration of an exemplary structure of a frame and an image pointing selection information used in the sixth embodiment of the present invention.

FIG. 29 shows a structure of a frame and an image pointing selection information used in this sixth embodiment. Here, the frame 124 stores a pointer to a region storing the image pointing selection information 125, and the video image data. When the image pointing selection information is not attached to this frame, the pointer indicates NULL. A region storing the image pointing selection information 125 stores a valid time of this information, i.e., a time until this video image becomes invalid, a number of pointing selection possible information for this frame, and a shape and a position data of a region on the video image for each pointing selection possible information.

Figure 30:
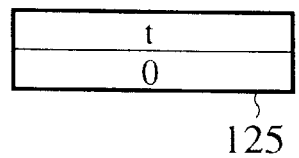
FIG. 30 is an illustration of an exemplary image pointing selection information used in the sixth embodiment of the present invention.

In addition, the image pointing selection information is attached to a scene change point in the video image, regardless of whether the pointing selection possible region exists there or not. When the pointing selection possible region does not exist at the scene change point, the image pointing selection information stores a number of pointing selection possible information equal to 0 as shown in FIG. 30.

Figure 31:
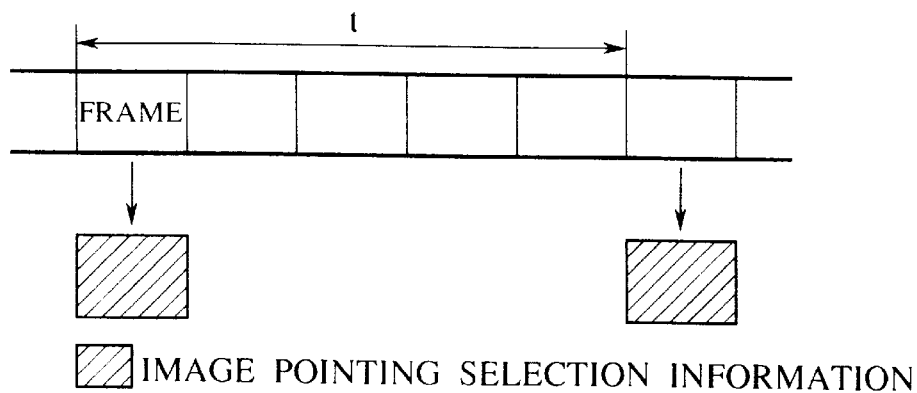
FIG. 31 is an illustration of an exemplary video data used in the sixth embodiment of the present invention.

The valid time of the image pointing selection information indicates a time t until a next frame to which a next image pointing selection information is linked, as shown in FIG. 31. When the image pointing selection possible frame does not exist after the frame to which this image pointing selection information is linked, a particular value for indicating this fact is stored as the valid time. For example, a negative value can be stored as the valid time in such a case.

FIG. 32 shows an exemplary region for storing the image pointing selection information. In this example, it is indicated that this information becomes invalid 3.5 seconds later. At this point, there are three pointing selection possible information, one in a shape of an ellipse and two in shapes of rectangles. For the position data, center coordinates, horizontal diameter, and a vertical diameter are stored for the elliptic region, while upper left corner coordinates and lower right corner coordinates are stored for the rectangular region.

In this system, when the user tries to enter the pointing selection mode, the video data are playbacked at the normal speed or at the high speed up until a frame in which the pointing selection possible region appears, then the video data playback is paused at that frame. When there is some time period during which the pointing selection can be made, it is also possible to slow down the playback of the video data during that time period, starting from that frame, instead of pausing the video data playback. In this case, it is necessary to account for the facts that the image pointing selection information is attached to one frame in every several frames and that the scene change exists, so that an information on an initial value Ti of the valid time of the current image pointing selection information and a remaining time Tr until the valid time of the current image pointing selection information expires is provided on the secondary memory device 107 or 108, as shown in FIG. 33.

Here, for a timing at which the user tries to enter the pointing selection mode, the following four possibilities as indicated in FIG. 34 can be considered.

In FIG. 34, when the user tries to enter the pointing selection mode at the timing A, the image pointing selection information is attached to this frame a so that a transition to the pointing selection mode is made immediately.

On the other hand, when the user tries to enter the pointing selection mode at the timing B or the timing C, an option for going backward to the frame β and an option for moving forward to the frame γ are available. Here, the image pointing selection information linked to the frame β has the valid time of this information recorded therein, so that it is possible to judge which one of the frame β and the frame γ is closer in time at a time of entering into the pointing selection mode. Then, the operation to moving forward or going backward to the closer one among these frames β and γ is carried out. This operation may be carried out at the normal speed, or at the high speed.

Also, when the user tries to enter the pointing selection mode at the timing D, a next frame to which a next pointing selection possible information is linked is the frame δ which belongs to another scene, so that it is necessary to go backward to the frame γ.

Figure 35:
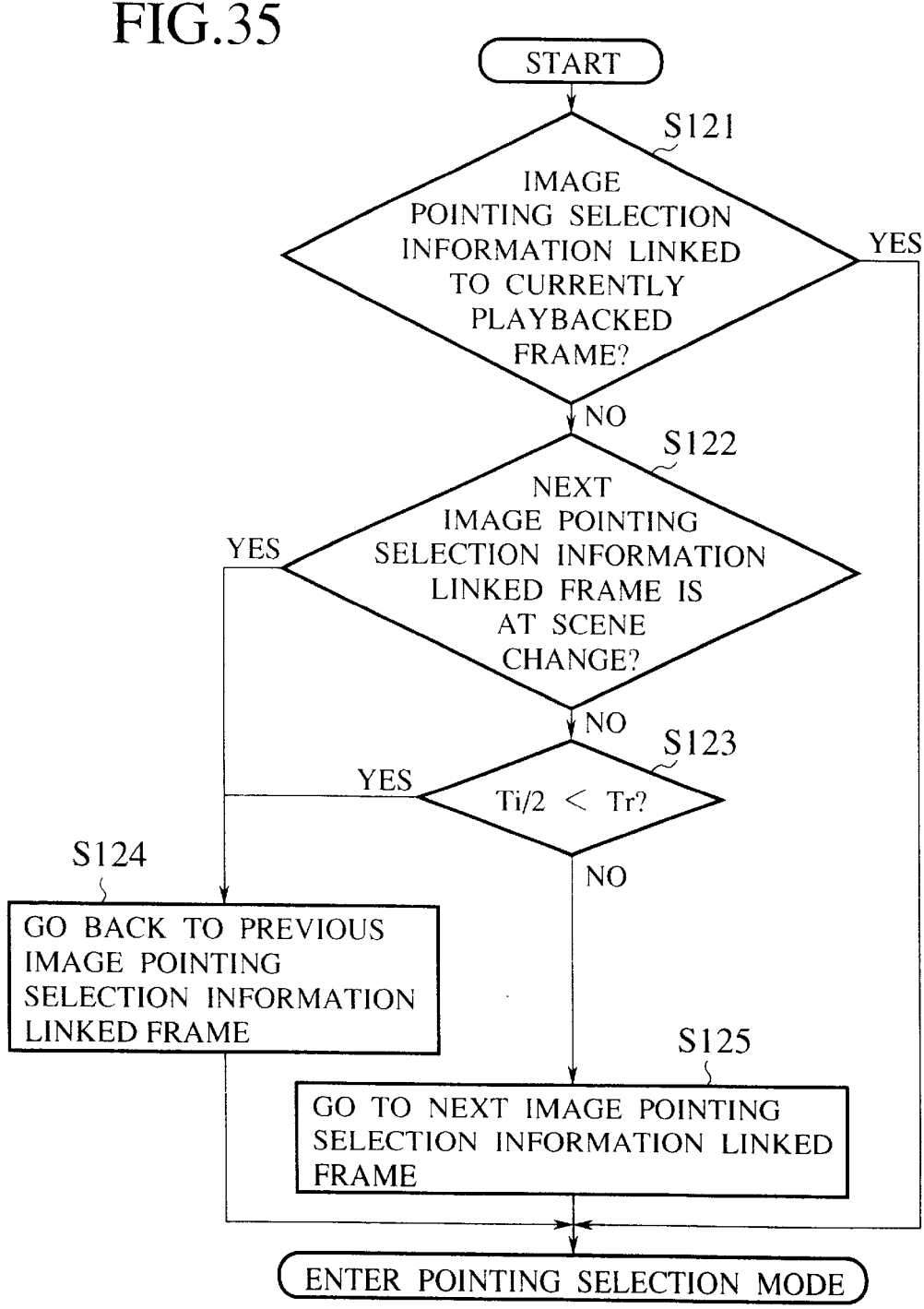
FIG. 35 is a flow chart for the operation in the sixth embodiment of the present invention in a case where a user tries to enter a pointing selection mode.

FIG. 35 shows a flow chart for the operation in this sixth embodiment in a case where the user tries to enter the pointing selection mode.

First, whether the image pointing selection information is linked to the currently playbacked frame or not is checked (step S121). When the image pointing selection information is linked (step S121 YES), the operation enters into the pointing selection mode immediately.

When the image pointing selection information is not linked (step S121 NO), whether a frame to which the next image pointing selection information is linked is at the scene change point or not is checked (step S122). When that next frame is at the scene change point (step S122 YES), the operation goes back to a frame to which the previous image pointing selection information is linked (step S124), and the operation enters into the pointing selection mode.

When that next frame is not at the scene change point (step S122 NO), Ti/2 and Tr are compared (step S123), and when Ti/2<Tr (step S123 YES), the operation goes back to a frame to which the previous image pointing selection information is linked (step S124), and the operation enters into the pointing selection mode. When Ti/2≧Tr (step S123 NO), the operation moves forward to a frame to which a next image pointing selection information is linked (step S125), and the operation enters into the pointing selection mode.

Seventh Embodiment

Referring now to FIG. 36 to FIG. 40, the seventh embodiment of the multimedia data display method and system according to the present invention will be described in detail.

This seventh embodiment is directed to a case of resolving the problem (C) mentioned above.

In this seventh embodiment, when the user makes a pointing selection of a part or a whole of the video image displayed on the display screen, the control unit 101 detects this pointing selection, determines the corresponding video image data from an information of a position on the display screen, and records an occurrence of the pointing selection to this determined video image data into the local or remote secondary memory device 107 or 108 so as to collect statistical information concerning accesses to the pointing selection possible video image.

Figure 38:
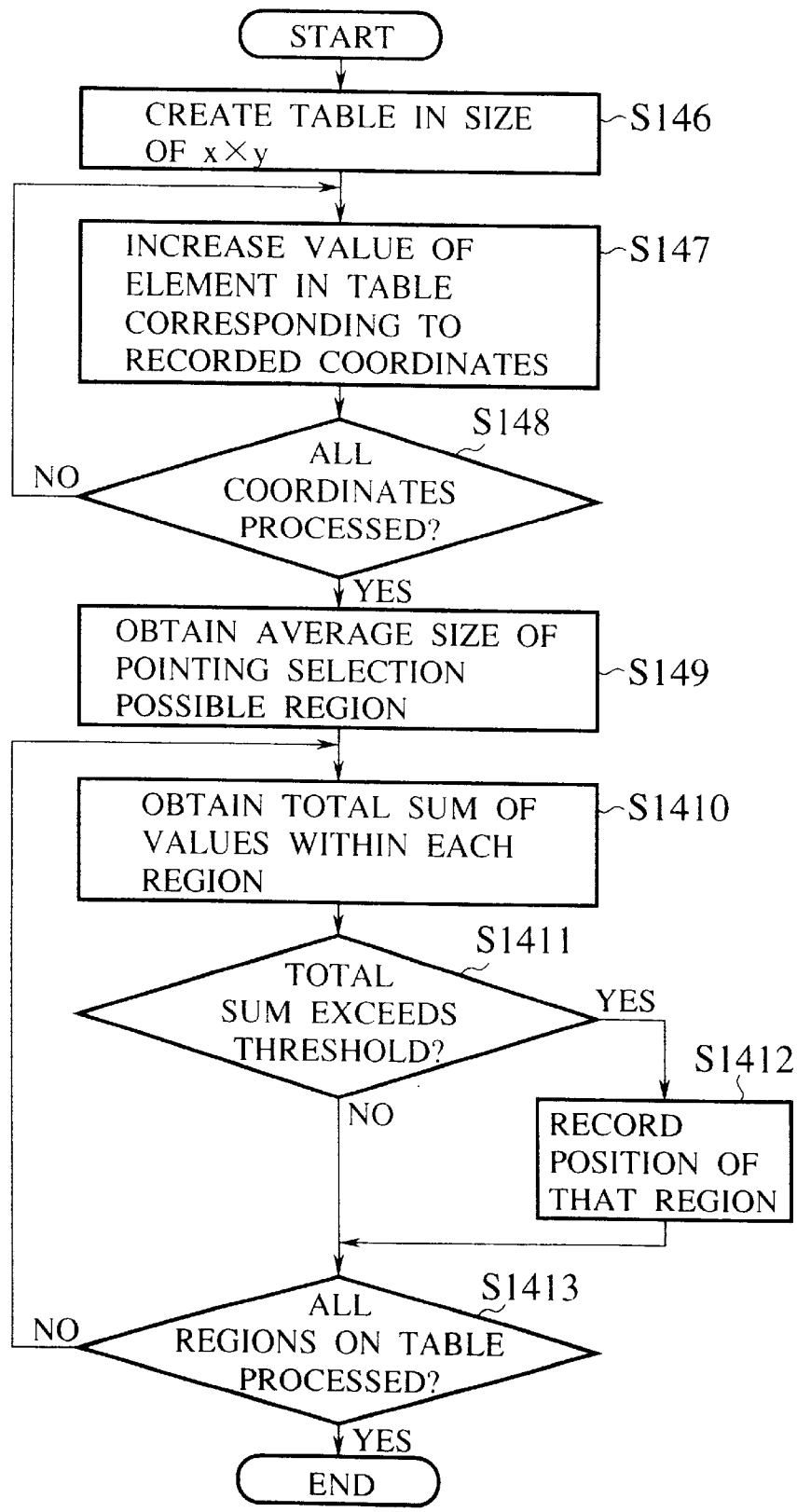
FIG. 38 is a flow chart for the operation to analyze a statistical information in the seventh embodiment of the present invention.

FIG. 36 shows a data structure necessary for collecting the statistical information in this seventh embodiment. Each scene of the video image is assigned with a unique scene number, and for each scene, this data structure of FIG. 38 provides a region for storing the access frequency of each pointing selection possible video image. In addition, for a case in which the user attempted to make a pointing selection at a region which is not pointing selection possible, the data structure of FIG. 36 also provides a region for storing a number of coordinates of regions for user's unsuccessful pointing selection attempts, and a region for storing coordinates of regions for user's unsuccessful pointing selection attempts.

Figure 37:
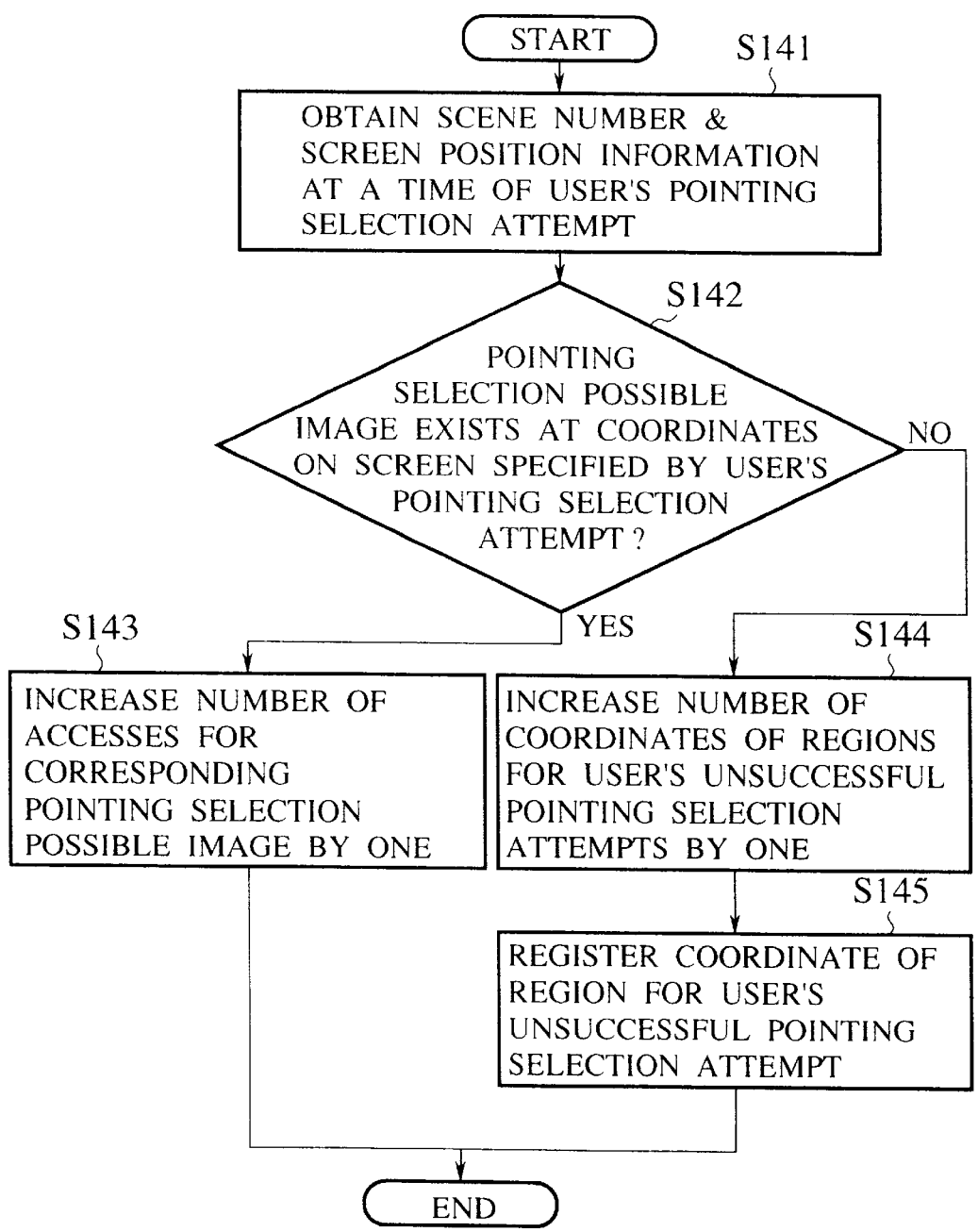
FIG. 37 is a flow chart for the operation to collect a statistical information in the seventh embodiment of the present invention.

FIG. 37 shows a flow chart for the operation to collect the statistical information.

First, a scene number and a screen position information at a time of the user's pointing selection attempt are obtained (step S141), and whether the pointing selection possible video image exists at the coordinates on the display screen specified by the user's pointing selection attempt exists or not is checked (step S142).

When the pointing selection possible video image does not exist (step S142 NO), a number of coordinates of regions for user's unsuccessful pointing selection attempts is increased by one (step S144), and coordinates of a region for this user's unsuccessful pointing selection attempt is registered into the data structure of FIG. 36 (step S145).

When the pointing selection possible video image exists (step S142 YES), a number of accesses for corresponding pointing selection possible video image is increased by one (step S143).

FIG. 38 shows a flow chart for the operation to analyze the statistical information collected from the user's unsuccessful pointing selection attempts.

Figure 39:
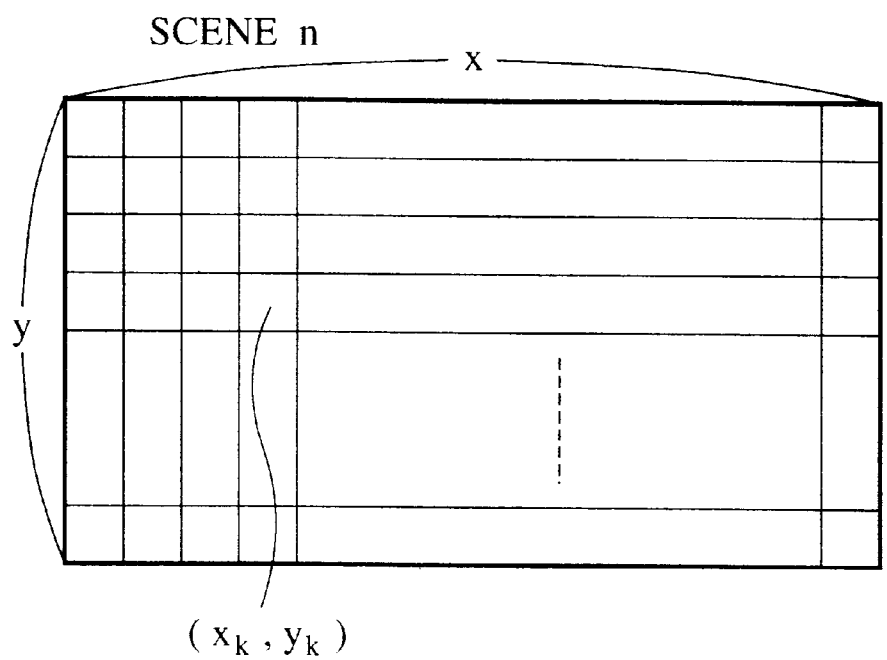
FIG. 39 is an illustration of a table used in a course of the operation of FIG. 38.
Figure 40:
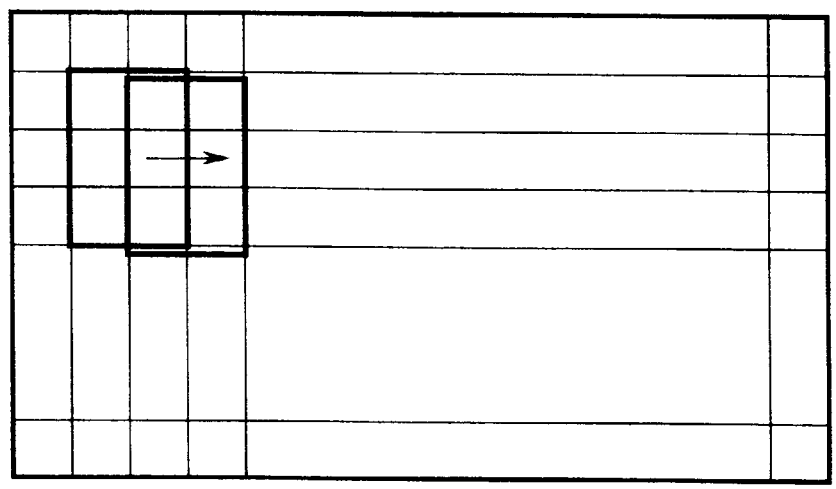
FIG. 40 is an illustration of a region in an average size used in a course of the operation of FIG. 38.

Here, by denoting the vertical and horizontal resolution levels of the display unit 112 as x and y, all the coordinates of regions for the user's unsuccessful pointing selection attempts registered in the data structure of FIG. 36 can be set within a table in a size of x×y. Therefore, first, a table in a size of x×y as shown in FIG. 39 is created for each scene (step S146), and an operation to increase a value of an element in this table corresponding to the recorded coordinates for each scene by one is carried out (step S147) for all the recorded coordinates (step S148). Then, an average size of a pointing selection possible region is obtained (step S149), and a total sum of values within each region in the average size is obtained (step S1410) by moving a region in the average size over the table as shown in FIG. 40. Then, the obtained total sum of the values within each region is compared with a prescribed threshold (such as a half of an area of the region for example). (step S1411), and when the total sum exceeds the threshold (step S1411 YES), a position of that region is recorded (step S1412). This operation of the steps S1410 to S1412 is carried out for all the regions on the table (step S1413). By this operation, it becomes possible to identify regions for user's unsuccessful pointing selection attempts within each scene.

The statistical information collected in this manner can then be utilized in such a manner that, when the pointing selection possible video images are already provided, the pointing selection possible video images with high access frequencies are stored into a high speed secondary memory device so as to increase the access speed for these frequently pointing selected video images, while the pointing selection possible video images with low access frequencies are stored into a low speed and inexpensive secondary memory device so as to reduce a cost required for the secondary memory device.

In addition, when the pointing selection possible video images are not provided, the statistical information can be analyzed to identify the regions for user's unsuccessful pointing selection attempts which indicate targets of user's interests, and this information regarding targets of user's interests can be utilized by a video data producing party at a time of producing the video data related to these targets of user's interests so as to meet the needs of the user.

Eighth Embodiment

Referring now to FIGS. 41 to FIG. 44, the eighth embodiment of the multimedia data display method and system according to the present invention will be described in detail.

This eighth embodiment is directed to a case of resolving the problem (C) mentioned above.

This eighth embodiment is largely divided into two features. The first feature concerns with the authoring for video image editing, and the second feature concerns with a scheme for obtaining the related information from the video image according to the information produced by the authoring of the first feature.

Figure 41:
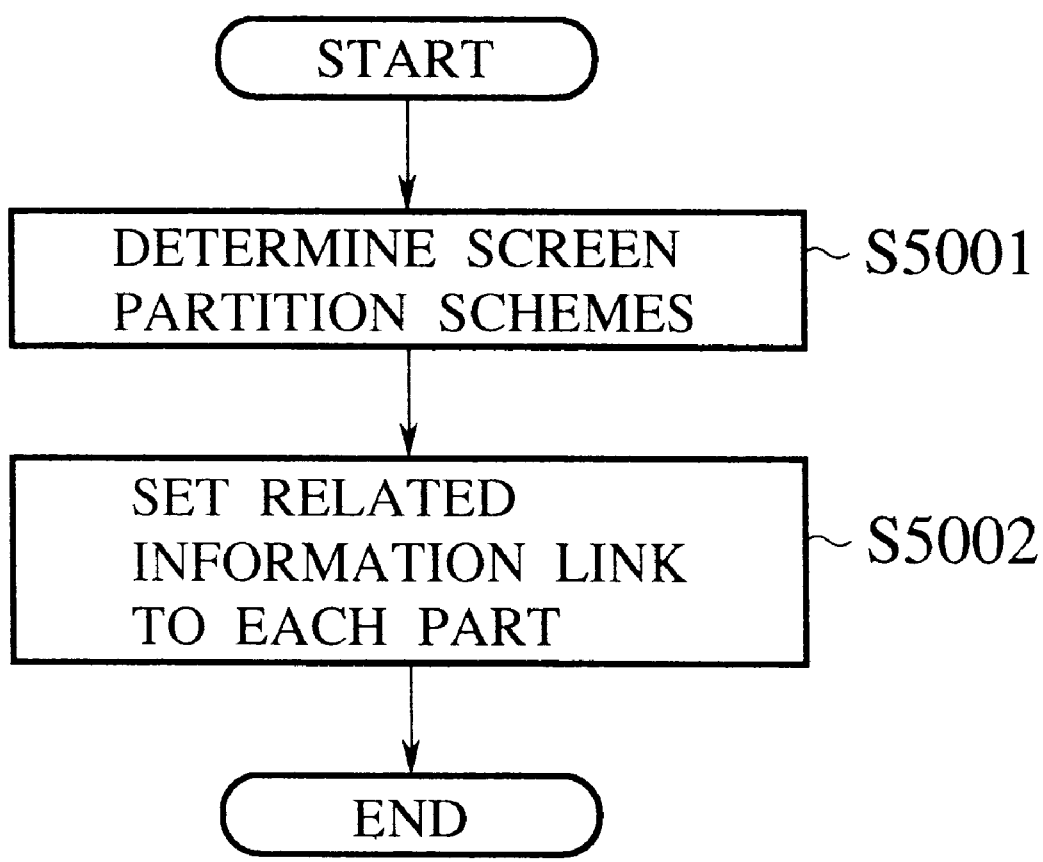
FIG. 41 is a flow chart for the operation by an operator of an authoring tool in the eighth embodiment of the present invention.

In the first feature, as indicated in the flow chart of FIG. 41, an operator of the authoring tool determines an appropriate screen partition schemes (step S5001), and attaches the related information to each part by setting a link (step S5002). This operation will now be described with references to FIGS. 42A and 42B.

Figure 42A:
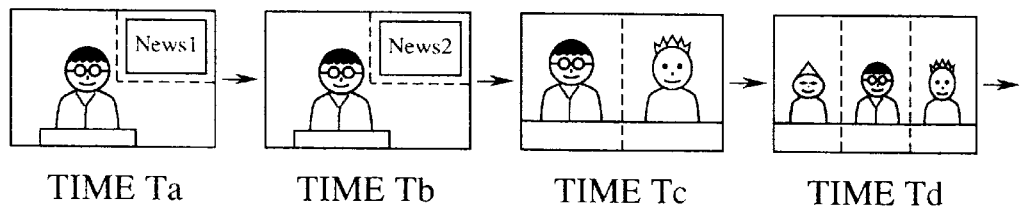
FIGS. 42A and 42B are illustration of four exemplary video images and corresponding data used in the eighth embodiment of the present invention.

In FIG. 42A, the video image at a time Ta shows a scene in which an announcer is speaking about the news1. while the video image at a time Tb shows a scene in which the same announcer is speaking about the news2. Also, the video image at a time Tc shows a scene in which the same announcer is taking with a guest1, while the video image at a time Td shows a scene in which the same announcer and the guest1 appear along with a guest2.

In this case, an operator of the authoring tool can Judge that it is convenient to partition the screen into an upper right quarter part and a remaining part at the times Ta and Tb, while the announcer and the guest1 can be separated by partitioning the screen into two vertically at the time Tc, and three persons can be separated by partitioning the screen into three vertically at the time Td.

Figure 42B:
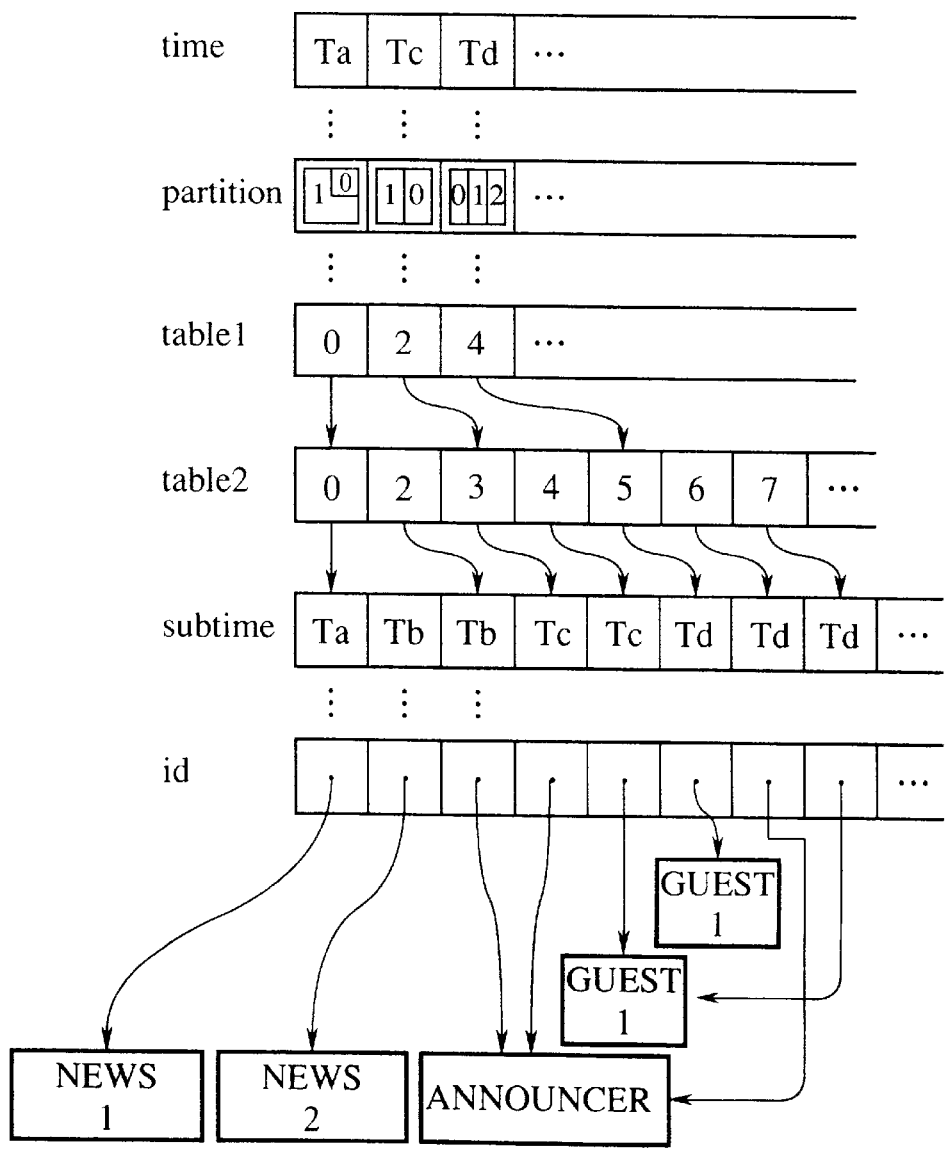

When the screen partition schemes are determined in this manner, data as shown in FIG. 42B are produced.

In FIG. 42B, an array "time" stores divisions in time for separating different screen partition schemes. In this example, elements of an array "time" includes Ta, Tc, Td, etc.

An array "partition" stores a partition which is considered appropriate for each time. In FIG. 42B, a manner of partitioning the screen is indicated by a picture, but in practice, a number assigned to each type of partition will be stored in this array "partition".

An array "table1" stores pointers to an array "table2" which stores data of each partition. In the array "table2", data for each part of each partition are stored. For this reason, as many table regions as a number of parts are provided for each partition.

An array "subtime" stores a valid time for the elements of each partition, while an array "id" stores related information at each time.

For example, at the time Ta, a number of parts is 2 so that two table regions on the array "table2" are taken, while at the time Td, a number of parts is 3 so that three table regions on the array "table2" are taken. From a time 0 until a time Tc, a number of parts is 2.

Also, the upper right part has two contents, so that two regions on the array "subtime" are taken, and the links of the related information for these two contents are similarly provided in the array "id". When there is no related information, a region in the array "id" indicates NULL.

Figure 43:
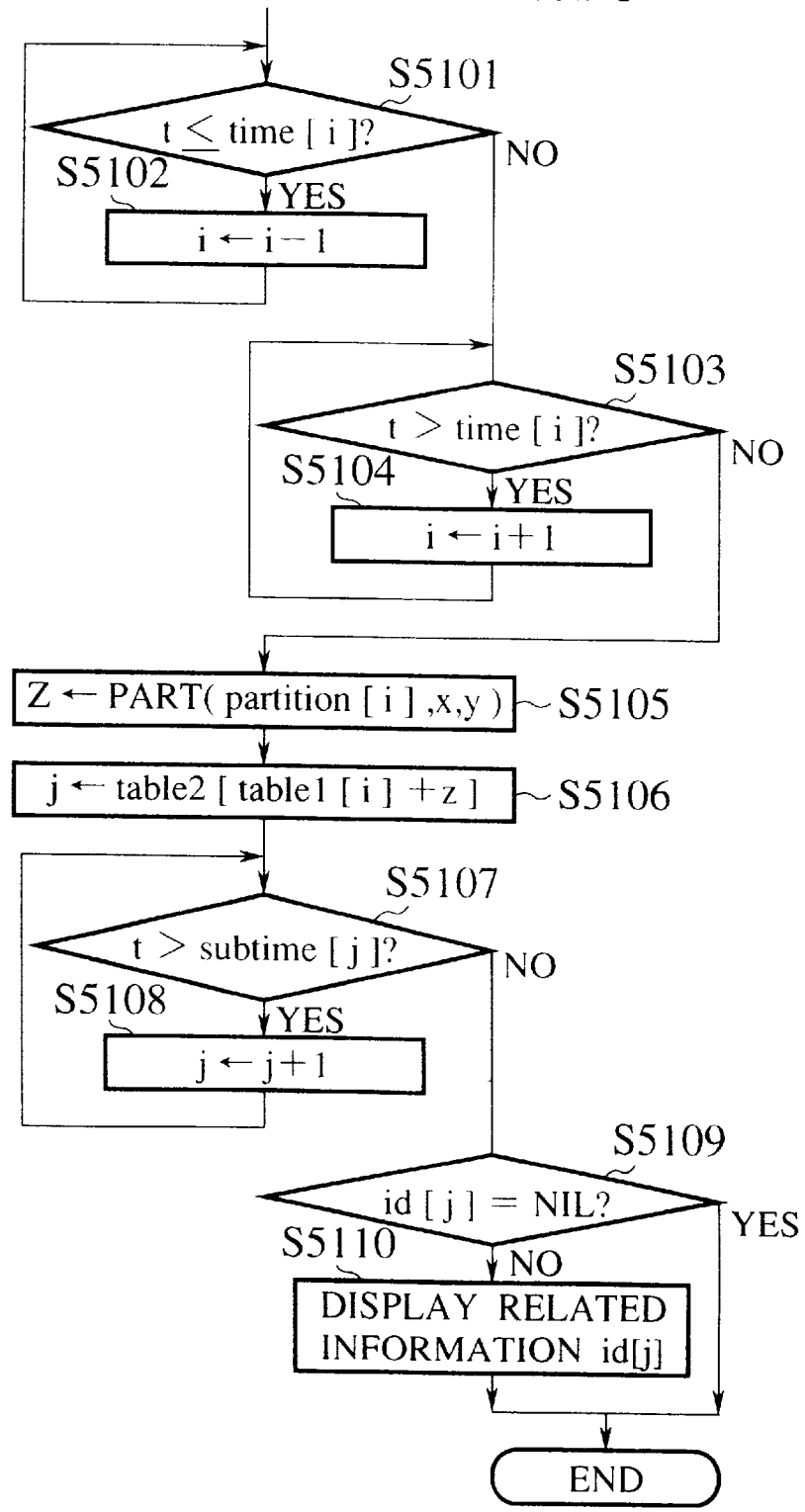
FIG. 43 is a flow chart for a mouse click interrupt processing by a control unit of the system of FIG. I in the eighth embodiment of the present invention.

Next, the second feature concerning the operation (mouse click interrupt processing) in a case where a pointing selection by the user is entered will be described with reference to the flow chart of FIG. 43.

First, a divided time zone to which the time t belongs is checked (steps S5101 to S5104). Here, an index i is set to 0 at a time of playback of the video image, and thereafter the previously used-value of i is reused without initializing it at a time of entering into the processing of FIG. 43.

Then, a part corresponding to the position selected by the user's pointing selection is checked by using a function PART, according to the partition scheme "partition[i]" at that time zone and the coordinates (x, y) of the position selected by the user(s pointing selection. The content of the function PART will be described below with reference to FIG. 44. A result of this function PART is then stored into a variable Z (step S5105).

Then, an index j of a data start position for storing the related information of a target object at a position and a time zone selected by the user's pointing selection is obtained as table2[table[i]+Z] (step S5106). Then, an index j at a time actually selected by the user is determined from the times using the same partition scheme (steps S5107, S5108).

Then, when a link to the related information id[j] at that index j is defined (step S5109 NO), this related information id[j] is displayed (step S5110).

Figure 44:
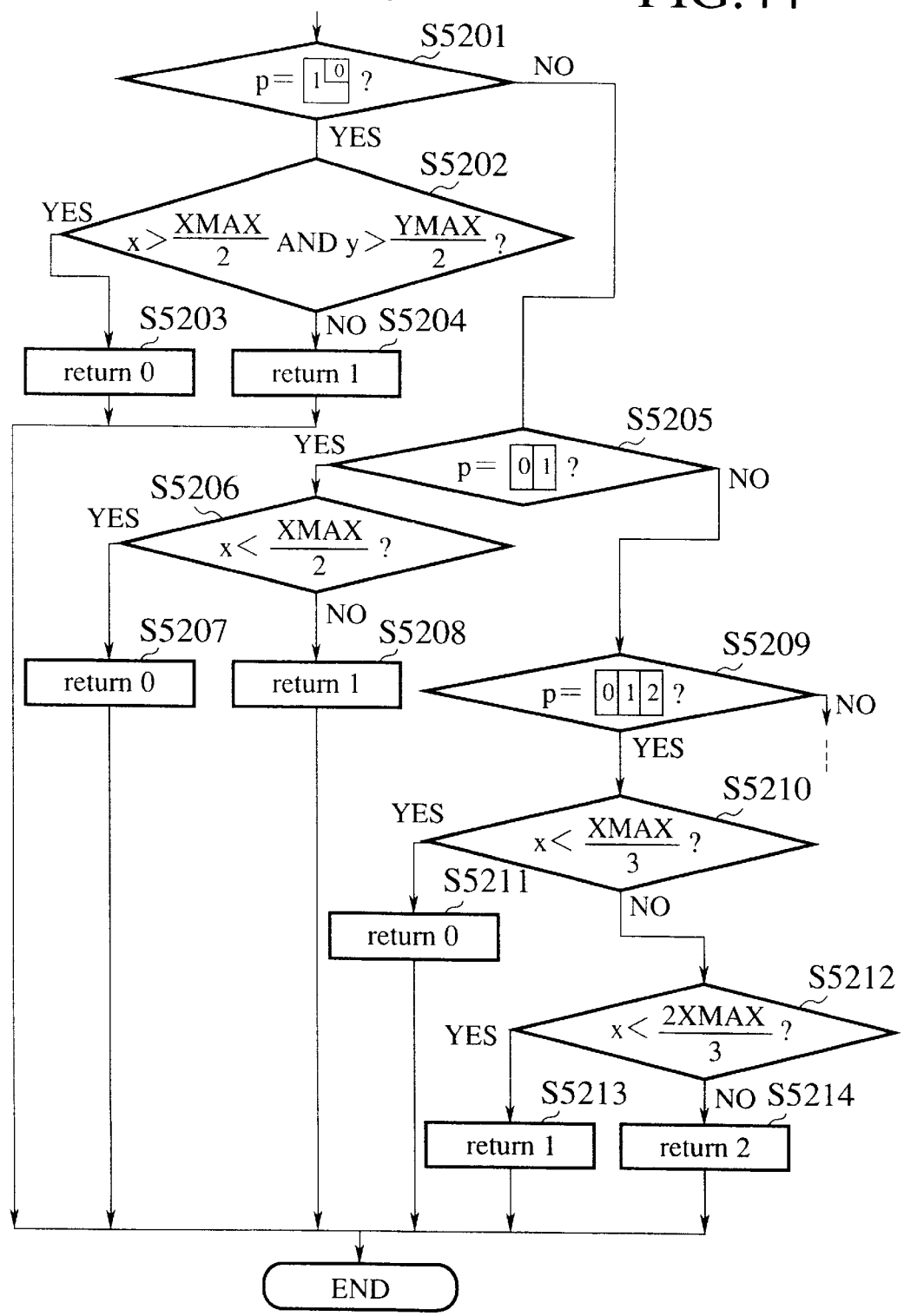
FIG. 44 is a flow chart for the operation of a function PART used in a course of the processing of FIG. 43.

The function PART used in the processing of FIG. 43 operates according to the flow chart of FIG. 44 as follows. Here, only a case of dealing with the partitions used in the example described above will be described, although in general, it is necessary to describe this function PART for each partition to be used. In the following, it is assumed that an origin is located at a lower left corner, a coordinate value increases in right and up directions, and the display screen region covers a region extending from (0, 0) to (XMAX, YMAX).

First, in a case of the partition at the time Ta (step S5201 YES), for a region in the upper right part (step S5202 YES), 0 is returned (step S5203), whereas otherwise (step S5262 NO), 1 is returned (step S5204).

Next, in a case of the partition at the time Tc (step S5205 YES), an x-coordinate is checked, and when the x-coordinate is in a range of the left half part (step S5206 YES), 0 is returned (step S5207), whereas otherwise (step S5206 NO), 1 is returned (step S5208).

Next, in a case of the partition at the time Td (step S5209 YES), when the x-coordinate is in a range of a left ⅓ part (step S5210 YES), 0 is returned (step S5211), whereas when the x-coordinate is in a range of a middle ⅓ part (step S5212 YES), 1 is returned (step S5213), and when the x-coordinate is in a range of a right ⅓ part (step S5212 NO), 2 is returned (step S5214).

For the other partitions, the function PART can be described in the similar manner.

As described above, it usually requires a considerable amount of time and efforts to exactly specify a position in the video image from which the related information can be obtained, as a part of the video image, but by setting the screen partition and specifying the related information within each part as in this eighth embodiment, the operation to attach the related information to the source video image becomes easier, and it also becomes easier to check a portion which is selected by the user's pointing selection.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for displaying multimedia data including video data, in a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of:

displaying the video data at a prescribed video display region;

displaying a prescribed pointing selection marker at a position specified by a user; and controlling a display of the video data so as to display the video data by a special display method when a display position of the pointing selection marker is moved from outside the video display region to inside the video display region and the related information is provided in correspondence to the video data currently displayed in the video display region, the special display method being different from a usual display method by which the video data are displayed when the display position of the pointing selection marker is located outside the video display region.

2. The method of claim 1, wherein the control step uses the special display method which displays a frame enclosing each pointing selection possible region.

3. The method of claim 1, wherein the control step uses the special display method which changes an image intensity and/or a color tone used for displaying each pointing selection possible region.

4. The method of claim 1, wherein the control step uses the special display method which pauses the display of the video data.

5. The method of claim 1, wherein the control step uses the special display method which lowers a display speed used for displaying the video data.

6. The method of claim 1, wherein the control step changes a display method used for displaying the video data from the special display method to the usual display method when the display position of the pointing selection marker is moved from inside the video display region to outside the video display region.

7. A method for displaying multimedia data including video data, in a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of:

displaying the video data at a prescribed video display region; and displaying an information indicating a presence/absence of a pointing selection possible region set up with respect to the video data currently displayed in the video display region.

8. The method of claim 7, wherein said information also indicates a number of pointing selection possible regions set up with respect to the video data currently displayed in the video display region.

9. A method for displaying multimedia data including video data, in a system which displays video data having at least one pointing selection possible region set up in advance and being associated with at least one related information provided in correspondence to the pointing selection possible region, the method comprising the steps of:

displaying the video data;

displaying one related information corresponding to a pointing selection possible region which contains a position specified by a user's pointing selection input; and controlling a display of the video data so as to display the video data by a special display method when said one related information is video information, while said one related information is displayed, the special display method being different from a usual display method by which the video data are normally displayed.

10. The method of claim 9, wherein the control step uses the special display method which pauses the display of the video data.

11. The method of claim 9, wherein the control step uses the special display method which lowers a display speed used for displaying the video data.

12. The method of claim 9, wherein the control step uses the special display method which raises a display speed used for displaying the video data.

13. A method for displaying multimedia data including video data, in a system which displays video data having at least one pointing selection possible region set up in advance and being associated with at least one related information provided in correspondence to the pointing selection possible region, the method comprising the steps of:

displaying the video data;

displaying one related information corresponding to a pointing selection possible region which contains a position specified by a user's pointing selection input; and controlling a display of said one related information so as to display said one related information by a special display method when said one related information is video information, the special display method being different from a usual display method by which the related information is normally displayed.

14. The method of claim 13, wherein the control step uses the special display method which pauses the display of said one related information.

15. The method of claim 13, wherein the control step uses the special display method which lowers a display speed used for displaying said one related information.

16. The method of claim 13, wherein the control step uses the special display method which raises a display speed used for displaying said one related information.

17. A method for displaying multimedia data including video data, in a system which displays video data formed by a series of frames, the video data having a plurality of pointing selection possible regions set up in advance and being associated with a plurality of related information provided in correspondence to the pointing selection possible regions, said plurality of related information including more than one related information which are provided with respect to different frames of the video data and which are linked together, the system also displaying a related information corresponding to a pointing selection possible region which contains a position specified by a user's pointing selection input, the method comprising the steps of:

displaying the video data, and sequentially updating a content of a related information to be displayed among said more than one related information in synchronization with a progress of a display of the video data.

18. The method of claim 17, further comprising the step of:

displaying said more than-one related information sequentially in synchronization with a progress of a display of the video data.

19. The method of claim 17, further comprising the steps of:

iconizing a display screen for said more than one related information: and displaying a sequentially updated content of a related information when an iconized display screen for said more than one related information is opened.

20. A method for displaying multimedia data including video data, in a system which displays video data formed by a series of frames, the video data having a plurality of pointing selection possible regions set up in advance with respect to a selected number of frames and being associated with a plurality of related information provided in correspondence to the pointing selection possible regions, the system also displaying a related information corresponding to a pointing selection possible region which contains a position specified by a user's pointing selection input, the method comprising the steps of:

displaying the video data; and controlling a display of the video data when a request for a transition to a mode for allowing a user's pointing selection input is entered and a currently displayed frame has no pointing selection possible region, by playbacking the video data up to another frame which has a pointing selection possible region, and pausing/slowing down the playback of the video data at said another frame.

21. The method of claim 20, wherein at the controlling step, said another frame is a frame closest to the currently displayed frame among all frames which have pointing selection possible regions.

22. The method of claim 20, wherein at the controlling step, said another frame is a frame closest to the currently displayed frame among frames which have pointing selection possible regions and which belong to an identical scene as the currently displayed frame.

23. A method for obtaining an information useful in producing multimedia data including video data, for a system which displays video data having at least one pointing selection possible region set up in advance and being associated with at least one related information provided in correspondence to the pointing selection possible region, the system also displaying a related information corresponding to a pointing selection possible region which contains a position specified by a user's pointing selection input, the method comprising the steps of:

displaying the video data;

receiving user's pointing selection inputs specifying desired positions in the video data for obtaining the related information;

collecting a statistical information on the desired positions specified by the user's pointing selection inputs; and providing the statistical information as an information indicative of targets of user's interests in the video data.

24. A method for displaying multimedia data including video data, in a system which displays video data formed by a series of frames, each frame being partitioned into partitioned parts by a prescribed partition scheme and being associated with a plurality of related information provided in correspondence to the partitioned parts, the method comprising the steps of:

displaying the video data;

receiving a user's pointing selection input specifying a desired position in a currently displayed frame for obtaining the related information; and displaying a related information provided in correspondence to one partitioned part which contains the desired position specified by the user's pointing selection input, by identifying said one partitioned part according to an information on the prescribed partition scheme used in partitioning the currently displayed frame and an information on the desired position specified by the user's pointing selection input.

25. A system for displaying multimedia data including video data, the video data having at least one pointing selection possible region set up in advance and being associated with at least one related information provided in correspondence to the pointing selection possible region, the system comprising:

a display device for displaying the video data at a prescribed video display region, a prescribed pointing selection marker at a position specified by a user, and a related information corresponding to a pointing selection possible region which contains a position specified by a user's pointing selection input; and a control device for controlling a display of the video data by the display device so as to display the video data by a special display method when a display position of the pointing selection marker is moved from outside the video display region to inside the video display region and the related information is provided in correspondence to the video data currently displayed in the video display region, the special display method being different from a usual display method by which the video data are displayed when the display position of the pointing selection marker is located outside the video display region.

26. A system for displaying multimedia data including video data, the video data having at least one pointing selection possible region set up in advance and being associated with at least one related information provided in correspondence to the pointing selection possible region, the system comprising:

first display means for displaying the video data at a prescribed video display region, and a related information corresponding to a pointing selection possible region which contains a position specified by a user's pointing selection input; and second display means for displaying an information indicating a presence/absence of pointing selection possible region set up with respect to the video data currently displayed in the video display region.

27. A system for displaying multimedia data including video data, the video data having at least one pointing selection possible region set up in advance and being associated with at least one related information provided in correspondence to the pointing selection possible region, the system comprising:

a display device for displaying the video data, and one related information corresponding to a pointing selection possible region which contains a position specified by a user's pointing selection input; and a control device for controlling a display of the video data by the display device so as to display the video data by a special display method when said one related information is video information, while said one related information is displayed, the special display method being different from a usual display method by which the video data are normally displayed.

28. A system for displaying multimedia data including video data, the video data having at least one pointing selection possible region set up in advance and being associated with at least one related information provided in correspondence to the pointing selection possible region, the system comprising:

a display device for displaying the video data, and one related information corresponding to a pointing selection possible region which contains a position specified by a user's pointing selection input; and a control device for controlling a display of said one related information so as to display said one related information by a special display method when said one related information is video information, the special display method being different from a usual display method by which the related information is normally displayed.

29. A system for displaying multimedia data including video data formed by a series of frames, the video data having a plurality of pointing selection possible regions set up in advance and being associated with a plurality of related information provided in correspondence to the pointing selection possible regions, said plurality of related information including more than one related information which are provided with respect to different frames of the video data and which are linked together, the system comprising:

a display device for displaying the video data, and a related information corresponding to a pointing selection possible region which contains a position specified by a user's pointing selection input; and a control device for sequentially updating a content of a related information to be displayed by the display device among said more than one related information in synchronization with a progress of a display of the video data.

30. A system for displaying multimedia data including video data formed by a series of frames, the video data having a plurality of pointing selection possible regions set up in advance with respect to a selected number of frames and being associated with a plurality of related information provided in correspondence to the pointing selection possible regions, the system comprising:

a display device for displaying the video data, and a related information corresponding to a pointing selection possible region which contains a position specified by a user's pointing selection input; and a control device for controlling a display of the video data by the display device when a request for a transition to a mode for allowing a user's pointing selection input is entered and a currently displayed frame has no pointing selection possible region, by playbacking the video data up to another frame which has a pointing selection possible region, and pausing/slowing down the playback of the video data at said another frame.

31. A system for obtaining an-information useful in producing multimedia data including video data, the video data having at least one pointing selection possible region set up in advance and being associated with at least one related information provided in correspondence to the pointing selection possible region, so as to be able to display a related information corresponding to a pointing selection possible region which contains a position specified by a user's pointing selection input, the system comprising:

a display device for displaying the video data; and a control device for receiving user's pointing selection inputs specifying desired positions in the video data for obtaining the related information, collecting a statistical information on the desired positions specified by the user's pointing selection inputs, and providing the statistical information as an information indicative of targets of user's interests in the video data.

32. A system for displaying multimedia data including video data formed by a series of frames, each frame being partitioned into partitioned parts by a prescribed partition scheme and being associated with a plurality of related information provided in correspondence to the partitioned parts, the system comprising:

a display device for displaying the video data, and a related information; and a control device for receiving a user's pointing selection input specifying a desired position in a currently displayed frame for obtaining the related information, identifying said one partitioned part according to an information on the prescribed partition scheme used in partitioning the currently displayed frame and an information on the desired position specified by the user's pointing selection input, and controlling the display device to display the related information provided in correspondence to said one partitioned part.

* * * * *